United States Patent
Jang et al.

(10) Patent No.: US 10,031,337 B2
(45) Date of Patent: Jul. 24, 2018

(54) GLASSES-TYPE TERMINAL AND METHOD FOR CONTROLLING THE SAME

(71) Applicant: LG ELECTRONICS INC., Seoul (KR)

(72) Inventors: Yujune Jang, Seoul (KR); Taeseong Kim, Seoul (KR); Jeongyoon Rhee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 112 days.

(21) Appl. No.: 14/733,528

(22) Filed: Jun. 8, 2015

(65) Prior Publication Data

US 2016/0011420 A1    Jan. 14, 2016

(30) Foreign Application Priority Data

Jul. 8, 2014  (KR) .................. 10-2014-0085415

(51) Int. Cl.
  *G09G 5/00* (2006.01)
  *G02B 27/01* (2006.01)
  *G06F 3/0488* (2013.01)
  *G06F 3/01* (2006.01)
  *G06F 3/0485* (2013.01)
  (Continued)

(52) U.S. Cl.
  CPC ....... *G02B 27/0172* (2013.01); *G02B 27/017* (2013.01); *G06F 3/012* (2013.01); *G06F 3/0346* (2013.01); *G06F 3/03547* (2013.01); *G06F 3/0485* (2013.01); *G06F 3/0488* (2013.01); *G02B 2027/014* (2013.01); *G02B 2027/0132* (2013.01); *G02B 2027/0138* (2013.01);
  (Continued)

(58) Field of Classification Search
  CPC ........ G02B 2027/0178; G02B 2027/01; G02B 2027/017; G02B 2027/0172; G02B 2027/0176; G02B 27/0149; G02B 2027/0138; G06F 3/012; G06F 3/03547; G06F 3/0485
  USPC ............................................................ 345/8
  See application file for complete search history.

(56) References Cited

U.S. PATENT DOCUMENTS 9,035,878 B1 * 5/2015 Wheeler ............... G06F 3/0484
                                                                        345/156
9,146,618 B2 * 9/2015 Tait ......................... G06F 3/017
(Continued)

FOREIGN PATENT DOCUMENTS

WO    2013/061940    5/2013

OTHER PUBLICATIONS

Anonymous, "Glass gestures—Google Glass Help," XP055219935, Oct. 2013, 3 pages.
(Continued)

*Primary Examiner* — Yuzhen Shen
(74) *Attorney, Agent, or Firm* — Lee, Hong, Degerman, Kang & Waimey

(57) ABSTRACT

Embodiments of the present invention include an eyewear-type mobile terminal, including a camera configured to capture an image, a frame formed to be worn on a user's head, a sensor configured to detect touches on the frame, a display coupled to the frame and configured to display information, and a controller configured to cause the display to display a first image captured via the camera in response to a predetermined first touch detected on the frame and terminate display of the first image when the first touch is released.

14 Claims, 27 Drawing Sheets

(51) Int. Cl.
*G06F 3/0346* (2013.01)
*G06F 3/0354* (2013.01)

(52) U.S. Cl.
CPC .............. *G02B 2027/0178* (2013.01); *G02B 2027/0181* (2013.01)

(56) References Cited

U.S. PATENT DOCUMENTS

| | | | |
|---|---|---|---|
| 2010/0079356 A1* | 4/2010 | Hoellwarth | G02B 27/017 345/8 |
| 2011/0234584 A1* | 9/2011 | Endo | G02B 27/017 345/419 |
| 2013/0135353 A1 | 5/2013 | Wheeler et al. | |
| 2013/0139082 A1* | 5/2013 | Wheeler | G06F 3/012 715/765 |
| 2013/0181888 A1* | 7/2013 | Kuriya | G02B 27/017 345/8 |
| 2014/0101608 A1* | 4/2014 | Ryskamp | G06F 3/0482 715/810 |
| 2014/0215365 A1* | 7/2014 | Hiraga | G06F 3/04883 715/765 |
| 2014/0232620 A1 | 8/2014 | Fujigaki | |
| 2017/0163866 A1* | 6/2017 | Johnson | H04N 5/23203 |

OTHER PUBLICATIONS

European Patent Office Application Serial No. 15001739.0, Search Report dated Nov. 9, 2015, 9 pages.

\* cited by examiner

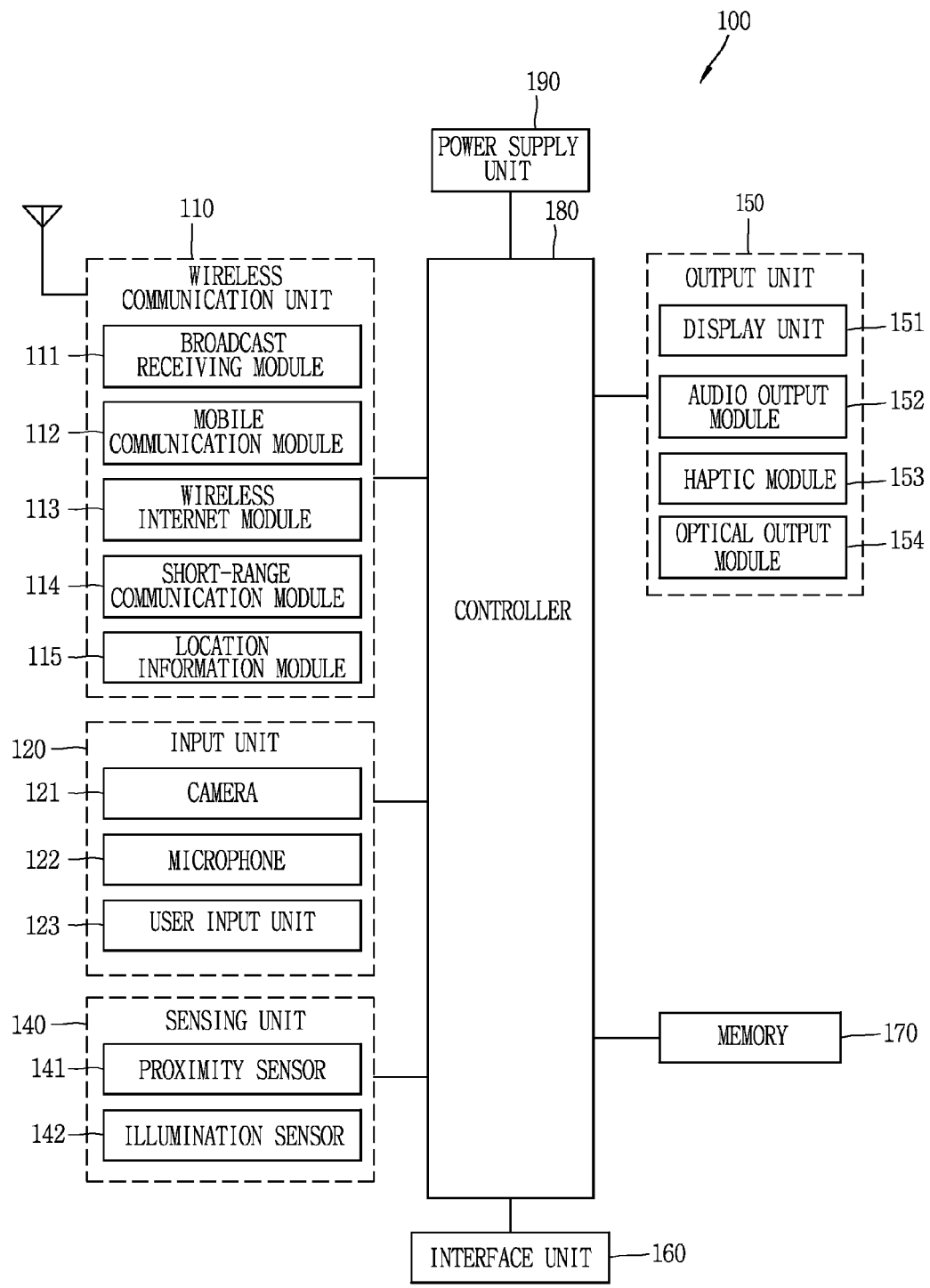

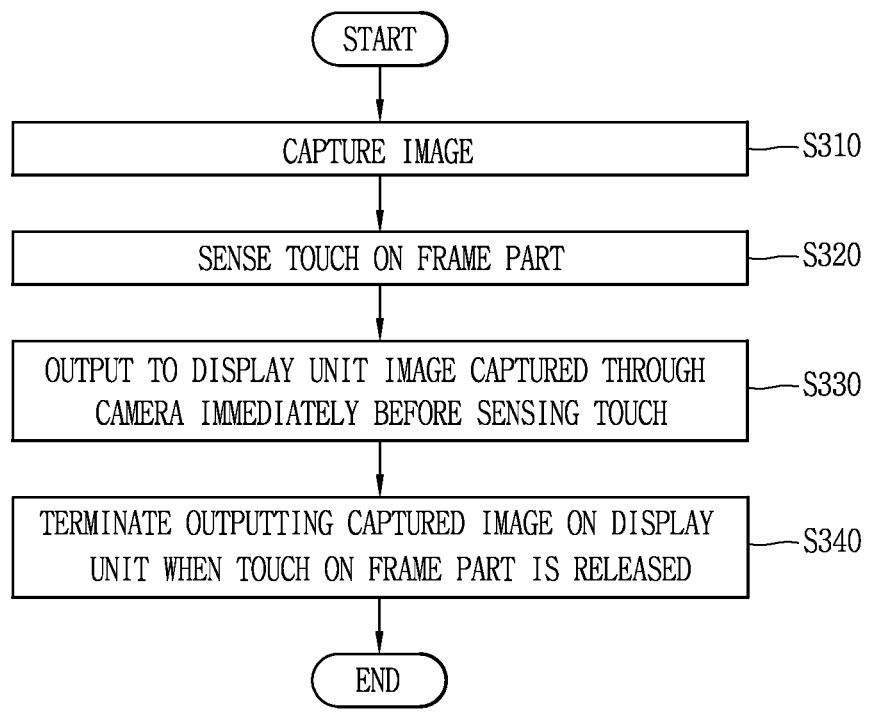

FIG. 5B
(a) 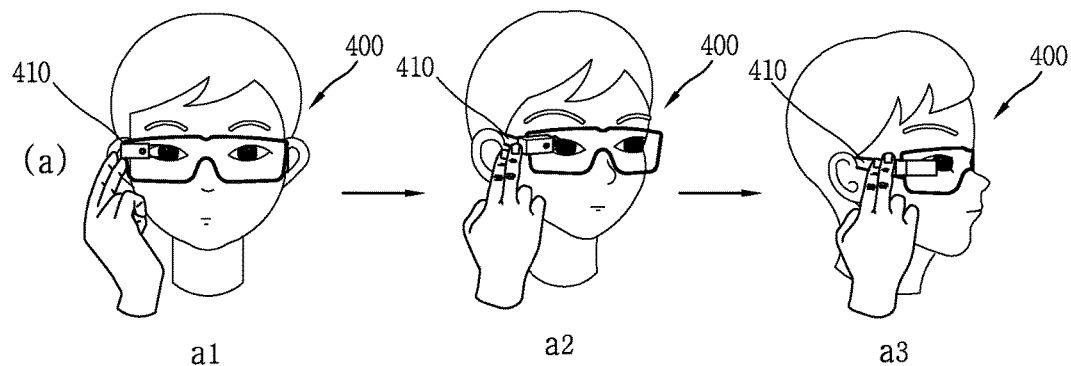
(b) 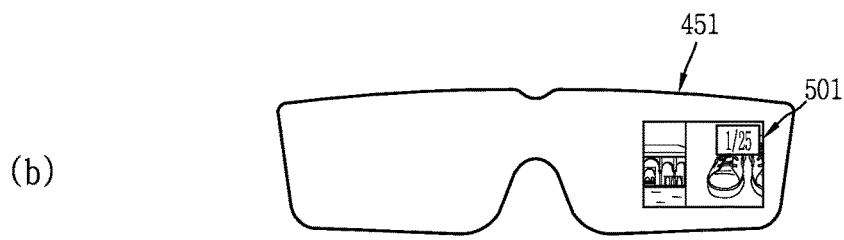
(c) 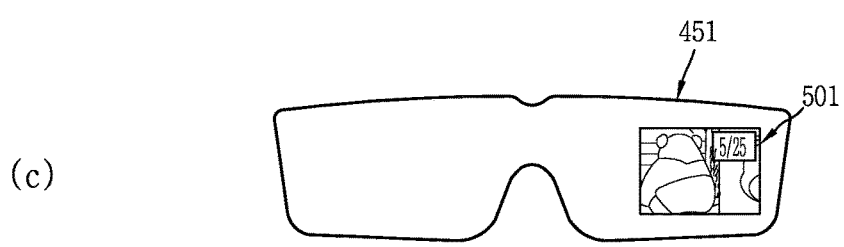
(d) 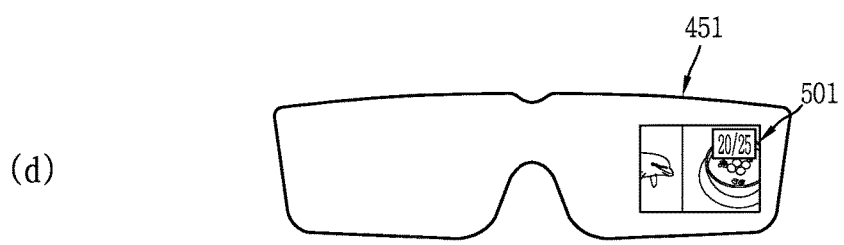

FIG. 6A
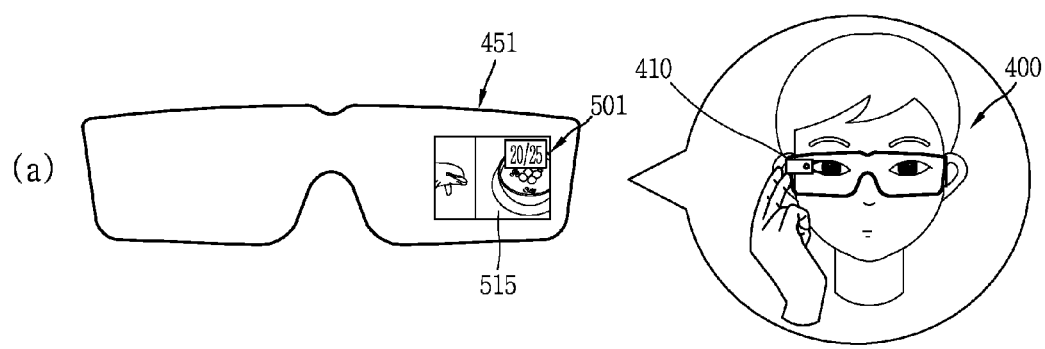
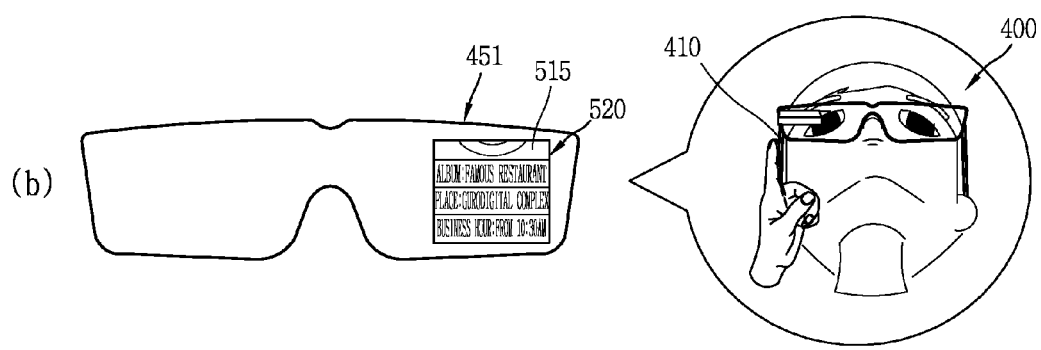

FIG. 6B
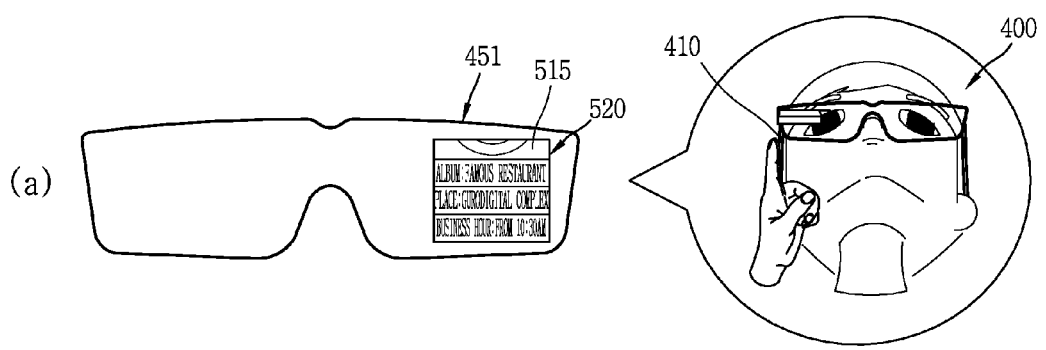
(a)
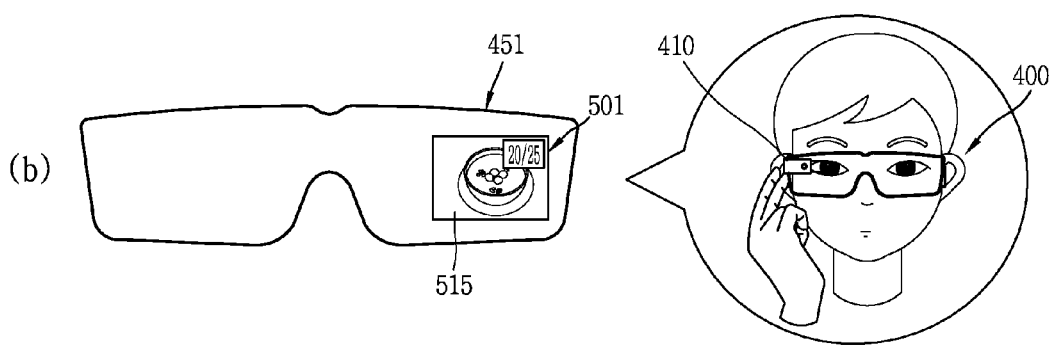
(b)

GLASSES-TYPE TERMINAL AND METHOD FOR CONTROLLING THE SAME

CROSS-REFERENCE TO RELATED APPLICATIONS

Pursuant to 35 U.S.C. § 119(a), this application claims the benefit of earlier filing date and right of priority to Korean Application No. 10-2014-0085415, filed on Jul. 8, 2014, the contents of which is incorporated by reference herein in its entirety.

BACKGROUND OF THE INVENTION

1. Field of the Invention

The present disclosure relates to a terminal configured to be used and worn on a user's head.

2. Description of Related Art

Recent mobile terminals are being expanded to wearable devices that may be worn or placed on a user's body rather than merely carried. An example of such wearable device is a glasses-type terminal worn on a user's face or head.

The glasses-type terminal may provide an imaging function via a camera. In view of the characteristics of wearable devices, a UX (User Experience)/UI (User Interface) may be considered for providing the user with an image captured by a glasses-type terminal.

SUMMARY OF THE INVENTION

An object of various embodiments of the present invention is to provide a glasses-type terminal that allows a user to easily access a captured image and a method for controlling the same. Various embodiments will be described herein with regard to glasses-type terminals, but such teachings apply equally to other types of terminals (e.g., eyewear-type) terminals.

Another object of the embodiments of the present invention is to provide a glasses-type terminal that allows for intuitive control of captured images using the structural characteristics of the glasses-type terminal and a method for controlling the same.

To achieve the above objects, a glasses-type mobile terminal comprises a camera configured to capture an image, a frame formed to be supported by a user's ear, a sensing unit configured to sense a touch on the frame, a display unit configured to be coupled with the frame, the display unit being of an MID (Head Mounted Display) type, and a controller configured to control the display unit to output an image captured through the camera, wherein the controller is configured to, when sensing a predetermined type of touch on the frame, output to the display unit an image captured through the camera immediately before sensing the touch, and when the touch on the frame is released, terminate outputting of the captured image.

In an embodiment, the image captured through the camera immediately before sensing the touch is a first image, and the controller is configured to output a second image different from the first image on the display unit based on a motion of the user rotating his head in a direction, while the terminal is on the user's head.

In an embodiment, the first image is displayed in a predetermined region on the display unit, wherein the first image moves in the direction within the predetermined region according to the motion, and wherein the second image is gradually displayed in the predetermined region as the first image moves.

In an embodiment, the second image is an image captured through the camera earlier than the first image, and the controller is configured to sequentially move images captured earlier than the first image while the motion is maintained.

In an embodiment, speeds at which the images move in the predetermined region corresponding to the motion, vary depending on a rotating speed of the user's head.

In an embodiment, the controller is configured to continue to move images captured through the camera even when the motion terminates in a case where a distance at which the head rotates satisfies a reference value.

In an embodiment, an image output in response to the predetermined type of touch is any one of a plurality of images captured through the camera, and wherein when sensing a dragged touch on the frame with the image output in response to the predetermined type of touch, the controller is configured to perform a scrolling function that allows the plurality of images to be sequentially output.

In an embodiment, when the user's head moves in the direction while the terminal is placed on the user's head, the controller is configured to output a list of functions relating to captured images in a region of the display unit.

In an embodiment, the list includes selectable items corresponding to the functions relating to the captured images, and at least one of the selectable items is selected in response to a touch on the frame.

In an embodiment, the frame comprises a first frame portion coupled with a first side of the display unit and a second frame portion coupled with a second side of the display unit, wherein the second frame portion is positioned opposite the first side, and wherein the controller is configured to allow a guide image to overlap any one of the selectable items when sensing a first touch on the second frame portion while the predetermined type of touch is applied to the first frame portion and the controller is further is configured to perform a function corresponding to a selectable item overlapping the guide image when sensing a second touch on the second frame portion, the first touch different from the first touch.

In an embodiment, the controller is configured to move the guide image according to a dragged touch on the second frame portion, the dragged touch continuous with the first touch.

In an embodiment, the list is configured to disappear from the display unit as the user's head moves in another direction opposite the previous direction of movement.

In an embodiment, the controller is configured to adjust a display size of the captured image in response to a dragged touch continuous with the predetermined type of touch.

In an embodiment, the controller is configured to magnify the captured image as the dragged touch is applied in a third direction and to shrink the captured image as the dragged touch is applied in a fourth direction opposite the third direction.

In an embodiment, the controller is configured to output other images captured through the camera while simultaneously shrinking and displaying the captured image when a length of the dragged touch applied in the fourth direction is larger than a reference value.

In an embodiment, the display unit is formed to be transparent. The display unit comprises an image projecting unit configured to project an image, and a light path changing part configured to change a path of the image projected from the image projecting unit.

In an embodiment, the controller is configured to output an image most recently captured through the camera when sensing the touch.

In an embodiment, the controller is configured to control the camera so that an image is captured through the camera when receiving a request for capturing an image with an image captured immediately before the touch is applied.

In an embodiment, the controller is configured to output to the display unit an image captured in response to the request for capturing the image instead of the image captured immediately before the touch is applied.

A method for controlling a glasses-type mobile terminal including an HMD (Head Mounted Display)-type display comprises capturing images through a camera and storing the captured images, sensing a touch on a frame, the frame configured to be coupled with the display unit, outputting to the display unit an image most recently stored among the stored images in response to the touch, and terminating the output of the most recently stored image on the display unit when the touch on the frame is released.

According to embodiments of the present invention, a glasses-type terminal may provide a captured image to a user in response to a touch on a frame. Accordingly, the user may identify the captured image by simply touching the frame.

Further, according to other embodiments of the present invention, a glasses-type terminal may output the latest captured image when sensing a touch on the frame after an image is captured through a camera. In other words the user may immediately identify captured images only by simple manipulation of touching the frame.

Further, according to other embodiments of the present invention, a glasses-type terminal may provide a captured image when sensing a touch on the frame and may terminate the output of the image when the touch is released.

Outputting an image and ending the output of the image may be controlled with a touch on the frame. Accordingly, a user may be intuitively provided with a function associated with a captured image.

Further, a glasses-type terminal may offer an additional function on a captured image, in response to a user's touch on the frame where the frame part may be used as an input means of inputting a control command, and thus, the glasses-type terminal may be effectively utilized.

BRIEF DESCRIPTIONS OF THE DRAWINGS

FIG. 1A is a block diagram illustrating a mobile terminal according to an embodiment of the present invention;

FIG. 3 is a flowchart illustrating an example control method according to an embodiment of the present invention;

FIGS. 5A, 5B, 5C and 5D are conceptual views illustrating a method for providing an image based on a user's motion in a glasses-type mobile terminal according to an embodiment of the present invention;

FIGS. 6A, 6B and 6C are conceptual views illustrating a method for providing an image based on a touch on a frame of a glasses-type mobile terminal according to an embodiment of the present invention;

Figure 1B:
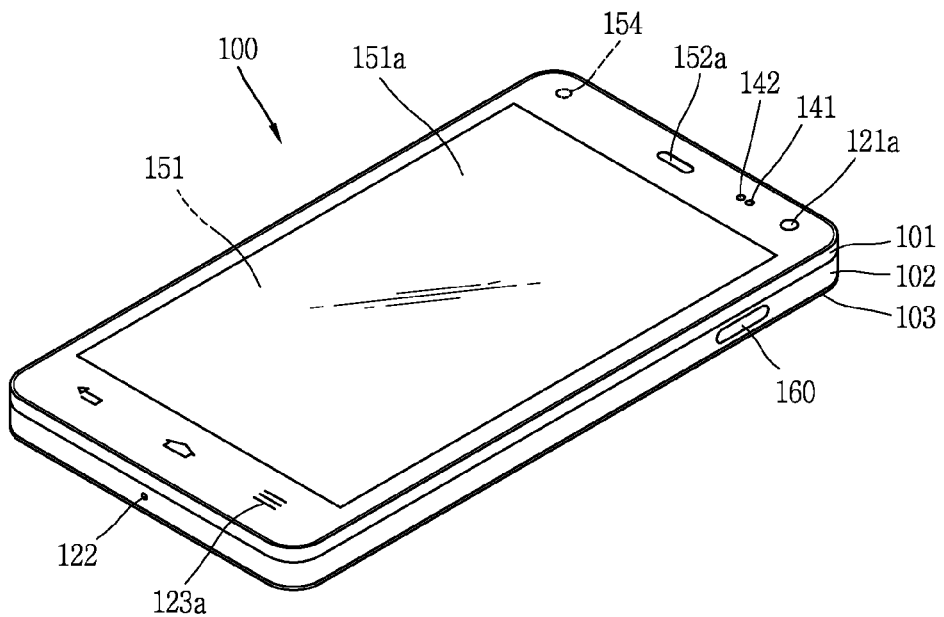
FIGS. 1B and 1C are perspective views illustrating a mobile terminal according to an embodiment of the present invention.

FIGS. 8A, 8B, 8C, 9A, 9B, 9C, 10A, 10B, 10C, 11 and 12 are conceptual views illustrating a method for providing a function relating to a captured image utilizing a touch on a frame in a glasses-type mobile terminal according to an embodiment of the present invention; and FIGS. 13A, 13B, 13C, 13D and 13E are conceptual views illustrating a method for selecting an image in a glasses-type mobile terminal according to an embodiment of the present invention.

DETAILED DESCRIPTION OF PREFERRED EMBODIMENTS

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like. Various embodiments will be described herein with regard to glasses-type terminals, but such teachings apply equally to other types of terminals (e.g., eyewear-type) terminals.

Figure 1C:
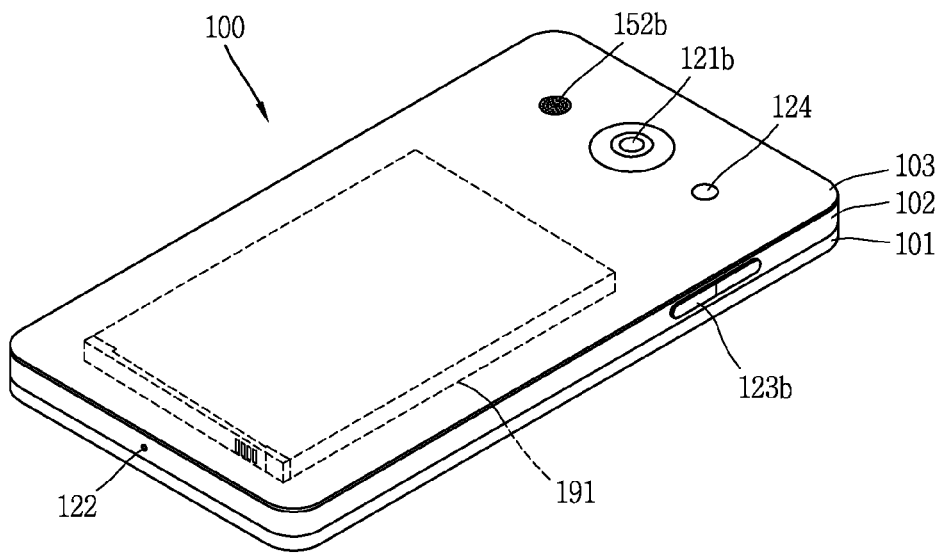

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

Referring now to FIG. 1A, the mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal is located.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142.

If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the various components depicted in FIG. 1A, or activating application programs stored in the memory 170. As one example, the controller 180 controls some or all of the components illustrated in FIGS. 1A-1C according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Referring still to FIG. 1A, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like). Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LIE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

FIGS. 1B and 1C depict certain components as arranged on the mobile terminal. However, it is to be understood that alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 (referring back to FIG. 1A) may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 1C, a flash 124 is shown adjacent to the second camera 121b. When an image of a subject is captured with the camera 121b, the flash 124 may illuminate the subject.

As shown in FIG. 1B, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

Figure 2A:
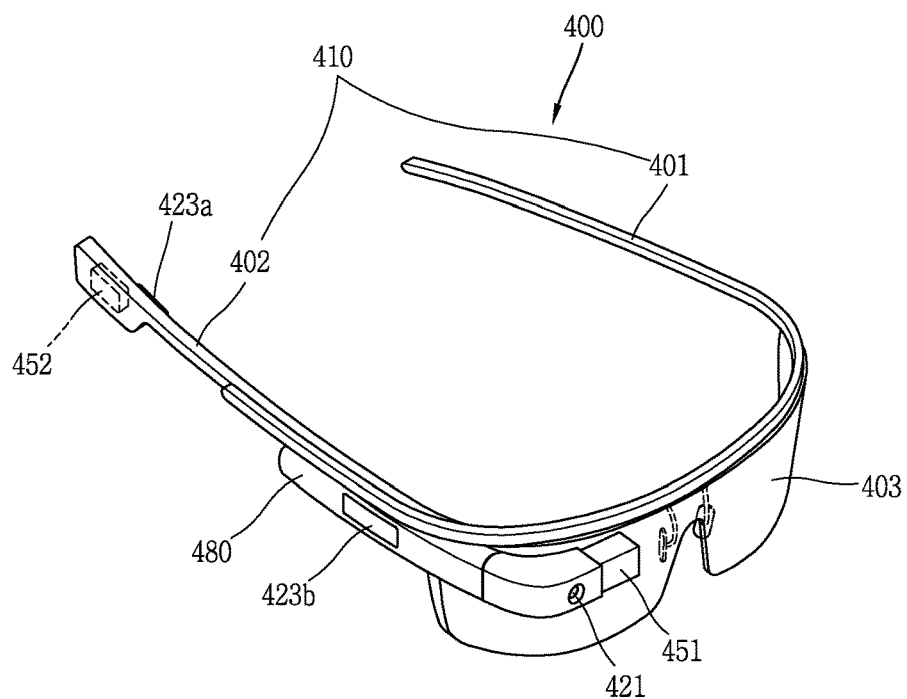
FIGS. 2A and 2B are perspective views illustrating an example of a glasses-type mobile terminal 400 according to another embodiment of the present invention.
Figure 2B:
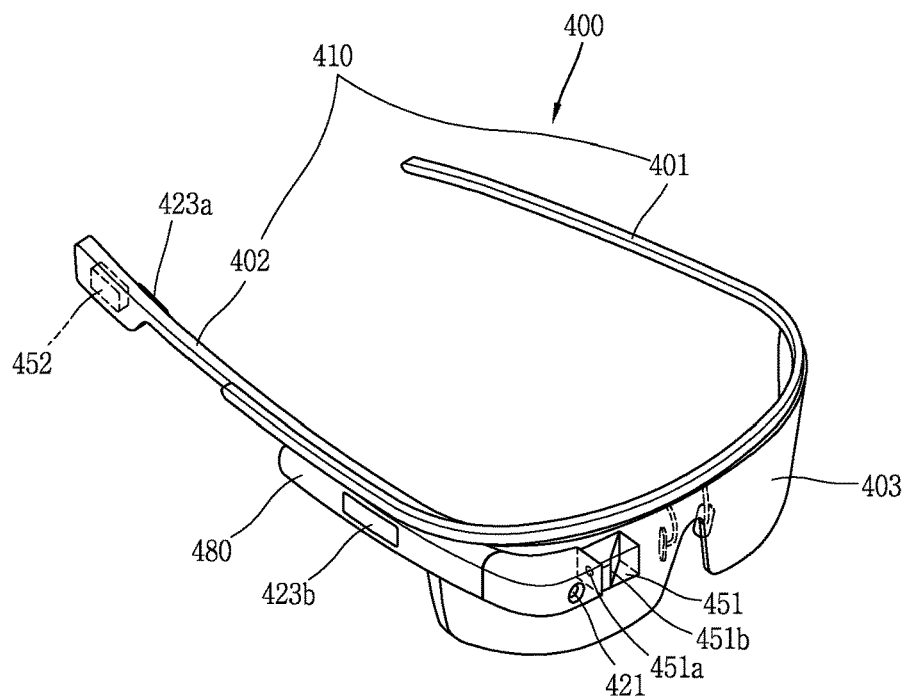

FIGS. 2A and 2B are perspective views illustrating an example of a glasses-type mobile terminal 400 according to another embodiment of the present invention.

The glasses-type mobile terminal 400 may configured to be put on a user's head, and for such purpose, may have a frame (e.g., a case or housing). The frame may be formed of a flexible material for easier wear. These views show an example in which the frame includes a first frame portion 401 and a second frame portion 402 that may be formed of different materials from each other. Typically, the glasses-type mobile terminal 400 may have the same or similar characteristics to the mobile terminal 100 as shown in FIGS. 1A to 1C.

The frame is supported by the user's head and provides a space in which various component parts may be mounted. As shown, electronic parts, such as a control module 480 (or a controller) or a sound output module 452, may be mounted in the frame. Further, a lens 403 that covers at least one of the user's left or right eye may be detachably mounted to the frame.

The control module 480 is configured to control various electronic parts provided in the glasses-type mobile terminal 400. The control module 480 may be appreciated to correspond to the controller 180 described above. Although in FIGS. 2A and 2B, the control module 480 is positioned on the frame over a side of the user's head, the position of the control module 480 is not limited thereto.

A display unit 451 may be implemented in the type of a head mounted display (HMD). The "HMD type" refers to a display type that is mounted on a user's head to directly show an image ahead of the user's eyes. The display unit 451 may be disposed to correspond to at least one of the user's eyes so that when the user puts on the glasses-type mobile terminal 400, an image is directly provided ahead of the user's eyes. In FIGS. 2A and 2B, as an example, the display unit 451 is disposed at a portion corresponding to the user's right eye so that an image may be output towards the user's right eye.

At least a portion of the display unit 451 may be transparent so that the user's view is not obstructed while no image is output from the display unit 451. The transparent portion of the display unit 451 may be a portion where an image is output. Further, the portion where an image is output may be positioned at an edge of the lens 403. Accordingly, the user's normal view range may be accounted for by the display unit. However, the present invention is not limited thereto, and the portion where an image is output may be disposed at a region that does not overlap the lens 403.

Referring to FIGS. 2A and 2B, the display unit 451 includes an image projecting part 451A and a light path changing part 451B.

The image projecting part 451A is configured to project an image generated from the controller's signal processing. The direction in which the image is projected may be a first direction parallel with a main surface of the lens 403. The image projecting part 451A has a light source and an optical system. The image projecting part 451A may be structured to generate an image by the optical system using light emitted from the light source and to project the image. In this case, elements in the optical system, which generate an image, together with the light source, may be controlled by the controller.

The light path changing part 451B is formed to change a path along which the image from the image projecting part 451A is projected. The light path changing part 451B is disposed on the path of the image projected from the light path projecting part 451A. For example, according to this embodiment, the light path changing part is disposed to be spaced from the image projecting part 451A along the first direction.

The light path changing part 451B refracts or reflects the image projected along the first direction to a second direction. As an example, the light path changing part 451B may be a prism or a mirror. In this case, the second direction may be a direction in which the image is projected to a surface of the lens or a direction in which the image passes through the lens 403 to the user's eyes.

In this embodiment, the display unit 451 projects an image to the user's eyes using a prism, for example. As shown, the prism may be formed of a transparent material to allow the user to view both the projected image and the user's normal front view range despite the prism overlapping the lens.

As such, the image output through the display unit 451 may be shown as overlapping the user's normal view range. The glasses-type mobile terminal 400 may use the characteristics of the display to offer augmented reality (AR) functionality by which a virtual image overlaps a real-life image or background to show a single image to the user.

A camera 421 is disposed adjacent to at least one of the user's left and right eyes to capture a front image. Since the camera 421 is positioned adjacent to the eye, the camera 421 may obtain the scene viewed by the user.

In these drawings, although the camera 421 is provided in the control module 480, for example, the present invention is not limited thereto. The camera 421 may be installed in the frame. A plurality of cameras may also be provided to obtain a stereoscopic image.

The glasses-type mobile terminal 400 may have user input units 423a and 423b to receive control commands. The user input units 423a and 423b may be configured to allow the user to manipulate them while having a tactile feeling such as by touching or pushing. In these drawings, as an example, the frame and the control module 480 have a push-type user input unit 423a and a touch-type user input unit 423b, respectively.

Further, the glasses-type mobile terminal 400 may include a microphone (not shown) that receives a sound and processes the received sound into electrical voice data and a sound output module 452 that outputs sound. The sound output module 452 may be configured to deliver a sound in a traditional auditory sound output scheme or via a bone conduction scheme. In case the sound output module 452 is implemented using the bone conduction scheme, when the user puts on the glasses-type mobile terminal 400, the sound output module 452 is brought in tight contact with the user's head so as to vibrate the user's skull to deliver a sound.

Meanwhile, as described above, the camera 421 of the glasses-type mobile terminal 400 is positioned adjacent to at least one of the user's left or right eyes to capture his front image. Since the camera 421 is positioned adjacent to an eye of the user, the camera 421 may obtain an image closely corresponding to a scene which the user is viewing. As such, since the scene viewed by the user acts as a preview image obtained through the camera 421, the glasses-type mobile terminal 400 does not need to output a separate preview image to the display unit 451 when in an image capturing function.

When an image is captured while no preview image is output on the display unit 451, the user may desire to verify the captured image. For example, although the camera and the user's viewing angle are mostly aligned, since the user's viewing angle may still slightly differ from the viewing angle of the camera, the image captured and displayed on the display unit 451 may be different from the scene that the user intended to capture as an image. Accordingly, the user may need to verify whether the desired scene has been captured in the image. Further, the user may need to output the captured image on the display unit 451 for the purposes of verifying the image quality of the captured image (e.g., whether an object has been precisely focused), simply viewing and enjoying the captured image, or performing a function associated with the captured image (for example, sending or sharing the image).

As discussed, the display unit 451 may be positioned to correspond to at least one of the user's left or right eyes. Accordingly, when information is displayed on the display unit 451, the information is likely to block the user's normal view. Accordingly, a method for providing a captured image to the user only when a need exists for the captured image is proposed.

Figure 4:
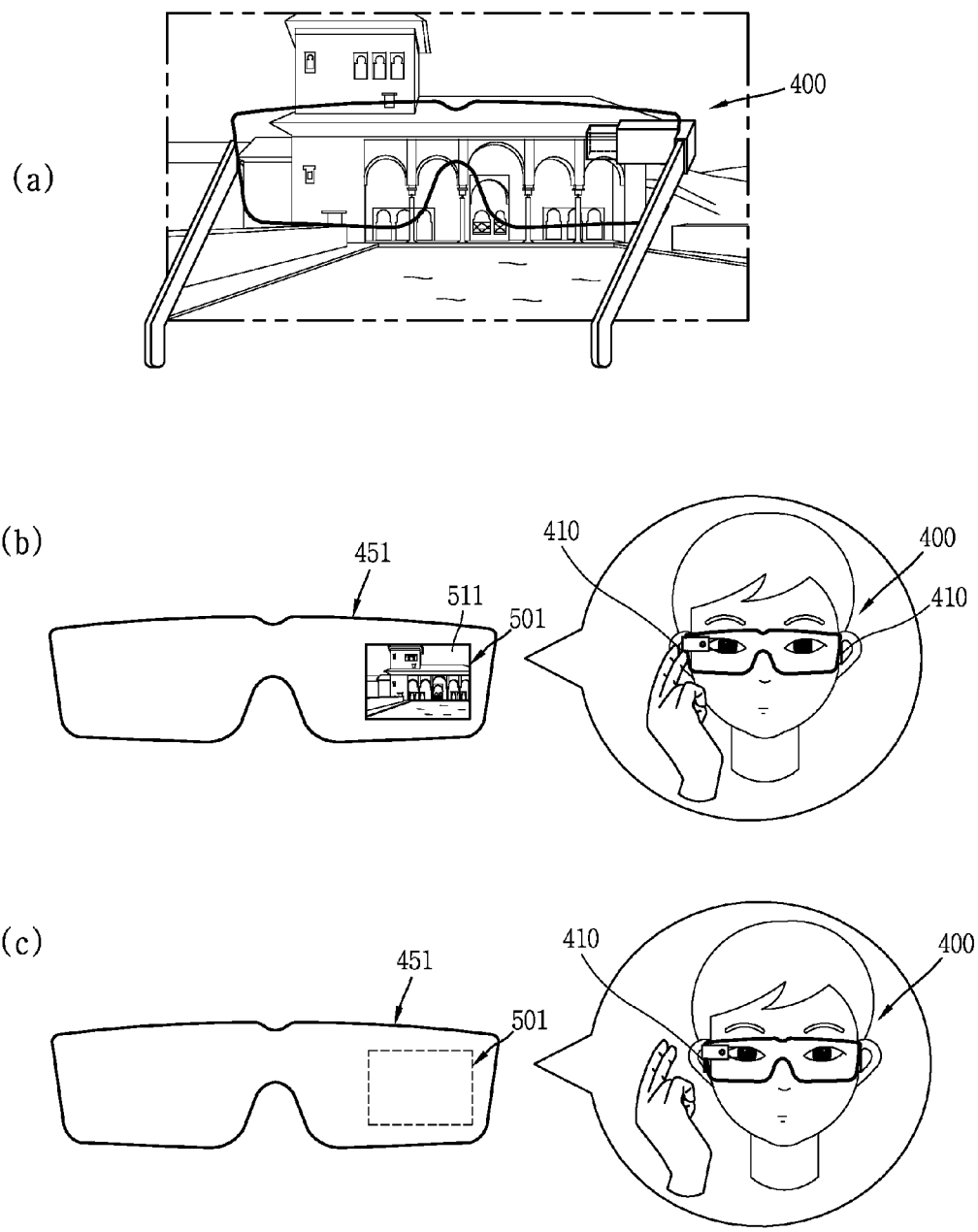
FIG. 4 is conceptual view illustrating a control method as described in connection with FIG. 3.

A method for outputting an image captured through a camera on a display unit is now described in detail with reference to the accompanying drawings. FIG. 3 is a flowchart illustrating a control method according to an embodiment of the present invention, and FIG. 4 is a conceptual view illustrating the control method shown in FIG. 3.

According to the present invention, the glasses-type mobile terminal 400 performs capturing an image (S310).

Here, the image capturing may be done through the camera 421 provided in the glasses-type mobile terminal 400 as described above in connection with FIGS. 2A and 2B. The image capturing by the glasses-type mobile terminal 400 may be performed in response to a control command applied in various schemes.

As an example, the control command may be input through a user's voice. The controller 480 may perform the image capturing function in response to the voice command. As another example, the control command may be applied in response to the user's manipulation of the user input units 423a and 423b (refer to FIG. 2A or 2B). As described above, the user input units 423a and 423b may be configured to allow the user to perform manipulation while providing tactile feedback, such as a touch or push. The control command may be applied based on a touch input or push input on the user input units 423a and 423b.

Further, the control command for image capturing may correspond to an image capturing request signal that is received from at least one external electronic device (e.g., a smartphone (or, mobile terminal or cellular phone) paired with the glasses-type mobile terminal. In other words, the controller 480, when receiving a signal to request image capturing from the external electronic device, may capture an image through the camera 421 in response to the request signal.

Thus the glasses-type mobile terminal 400 may perform an image capturing function in response to a control command applied in various manners.

If the image capturing is done through the camera 421, the controller 480 stores the captured image in the memory 170. The controller 480 may store the captured image in the memory 170 only when receiving a request for storing the captured image. In other embodiments, the controller 480 may automatically store the image in the memory 170. In yet other embodiments, the controller 480 may receive a user's selection as to whether to store the captured image automatically or only when receiving a request for storing the image. Thus, the controller 480 may store an image in the memory 170 immediately when the image is captured or only when receiving a request for storing the image, depending on the user's selection. Hereinafter, the description is made with respect to the image stored in the memory 170. Accordingly, the captured image described below is the image that is stored in the memory 170 after being captured by the camera 421.

The memory 170 may be appreciated as including a memory provided in the glasses-type mobile terminal, at least one external server (or cloud server) that communicates with a glasses-type mobile terminal, or both. In the glasses-type mobile terminal, a captured image may be uploaded to the at least one external server immediately or after a predetermined time elapses. In such case, the controller 480 may delete the uploaded captured image from the memory provided in the glasses-type mobile terminal. Further, the captured image may be stored in the at least one external server while remaining in the memory provided in the glasses-type mobile terminal.

Referring back to FIG. 3, after the image capturing, sensing a touch on the frame 410 is performed (S320).

According to an embodiment of the present invention, the glasses-type mobile terminal may be configured to sense a touch on the frame 410 as well as the user input units 423a and 423b.

As shown in FIGS. 2A and 2B, the frame 410 may include a first frame portion 401 and a second frame portion 402. According to the present invention, the glasses-type mobile terminal may be configured to have a touch sensor in either or both of the first and second frame portions 401 and 402.

For the purposes of this example, the first and second frame portions 401 and 402 are disclosed to each have a touch sensor. The first and second frame portions 401 and 402 may be collectively referred to as the frame 410 except when the first and second frame portions 401 and 402 need be described separately. In other words, it should be appreciated that the description of the frame 410 may apply to each of the first and second frame portions 401 and 402.

The block S302 of sensing a touch on the frame 410 need not be performed continuously with the step S310 of capturing an image. A touch on the frame 410 need not occur immediately after an image is captured.

When sensing a touch on the frame 410, the glasses-type mobile terminal may perform outputting to the display unit 451 an image captured through the camera 421 before sensing the touch on the frame 410 (S330).

The controller 480 may output, to the display unit 451, the image most recently captured through the camera 421 in response to the touch on the frame 410. Thus, the user may receive the captured image by touching the frame 410.

The controller 480 may output the image captured before the touch is sensed once the touch on the frame is sensed regardless of the type of touch on the frame 410.

For example, as shown in FIG. 4(a), an image is captured through a camera 421 (refer to FIG. 2A or 2B). As shown in FIG. 4(b), if a touch of a predetermined type is applied to the frame 410, the controller 480 outputs to the display unit 451 the image 511 captured through the camera immediately before the touch is applied.

In this case, the controller 480 may output the captured image 511 in a predetermined region 501 of the display unit

451. As shown, according to the present invention, in response to a touch on the frame 410, a captured image may be output.

In some embodiments, the controller 480 may output the captured image right before the touch is sensed only when sensing a predetermined type of touch on the frame 410. Here, the predetermined type of touch may be one of various touch types. The predetermined type of touch may be defined by the number of touching points (or touching regions), whether the touching point can vary (for example, a dragged touch might be appreciated as the point of touch has changed), the direction in which the touch point varies (for example, in the case of a dragged touch, a direction along which the dragged touch moves), duration of the touch, etc. The number of touching points (or touching regions) may mean the number of fingers touching the frame 410. For example, the predetermined type of touch may be defined as a short touch having two touching points. As another example, the predetermined type of touch may be defined as a long touch having a single touching point. As such, the predetermined type of touch may be one of various touch types.

The controller 480, outputs to the display unit 451 the image captured through the camera 421 immediately before the predetermined type of touch is sensed corresponding to the predetermined type of touch.

The controller 480 may output to the display unit 451 the image most recently captured through the camera 421 when sensing the predetermined type of touch on the frame 410 even when the image capturing function or a function unrelated to the captured image is being performed in the glasses-type mobile terminal.

For example, the function of outputting the captured image may match the predetermined type of touch. In this case, once there is the predetermined type of touch, the controller 480 may output the latest captured image regardless of the function that is presently being performed in the glasses-type mobile terminal. By way of example, when sensing the predetermined type of touch on the frame 410 while a messenger application is miming, the controller 480 outputs the latest captured image to the display unit 451. In this case, the information that was being output to the display unit 451 before the captured image is output may overlap the captured image or may disappear from the display unit 451 while the captured image is being output. In other embodiments, the controller 480 may control the position where the captured image is output so that the captured image does not overlap the screen information that is being output from the display unit 451 before the captured image is output.

Meanwhile, even when the latest captured image is output in response to the predetermined type of touch, the function that had been in execution in the glasses-type mobile terminal may be maintained.

The controller 480 may maintain the output of the image on the display unit 451 while the touch on the frame 410 is maintained. In other words, as long as the predetermined type of touch on the frame part 410 is maintained, the controller 480 may continue outputting the latest captured image. Further, even upon sensing another touch continuous to the predetermined type of touch, the controller 480 may maintain the output of the image captured through the camera 421.

Referring back to FIG. 3, the glasses-type mobile terminal 400 performs terminating the output of an image to the display unit 451 in response to the touch on the frame 410 being released (S340).

The controller 480 outputs the image captured through the camera 421 to the display unit 451 while the touch on the frame 410 is maintained, and if the touch to the frame part 410 is released, the controller may control the display unit 451 so that the image displayed on the display unit 451 disappears.

With reference to FIGS. 4(*b*) and 4(*c*), if the touch on the frame 410 is released as shown in FIG. 4(*c*), the controller 480 may terminate the output of the captured image 511 and the captured image 511 may disappear from the predetermined region 501. Thus, the user may control the output of an image and the termination of the output through a touch on the frame 410 and releasing the touch.

When the touch on the frame 410 is released, the image output through the display unit 451 may be an image captured through the camera 421 right before the predetermined type of touch is sensed or may be another image captured through the camera 421, which is different from the image captured immediately before. Upon touching the frame 410, the touch type may be the same or different from the predetermined type.

The glasses-type mobile terminal may output the latest captured image in response to the predetermined type of touch being sensed on the frame 410, and in response to an additional touch on the frame 410, may then control the latest captured image or other image captured through the camera or perform a function relating thereto.

In the above embodiment, the controller 480 determines an image to be output in response to the touch on the frame with respect to the time that the image was captured. However, the present invention is not limited thereto, and the image to be output in response to the touch on the frame may be determined according to various criteria. For example, the controller 480 may determine the image with respect to the time that the image was stored in the memory 170. For example, when an image is captured through the camera 421 an image different from the image captured through the camera 421 (such as a downloaded image) may be output in response to the touch on the frame 410. Thus, the glasses-type mobile terminal may utilize the touch on the frame 410 as a command for executing an output function of another image stored in the memory 170.

The images stored in the memory 170 may be classified by folder or category. The controller 480 may output an image stored in a particular folder or an image corresponding to a particular category based on at least one of a touching type on the frame 410, whether the first or the second frame 401 and 402 has been touched, or the position where the frame 410 is touched, and the like. The controller 480 may output different images on the display unit 451 based on such various criteria.

Further, according to an embodiment of the present invention, an image stored in an external electronic device paired with the glasses-type mobile terminal may be output in response to the touch on the frame 410. In this case, the touch on the frame 410 may be a different type of touch from the touch for outputting the image stored in the glasses-type mobile terminal.

Although not shown, the glasses-type mobile terminal may output a captured image independently from the function of capturing an image in response to the touch on the frame 410.

As described above in connection with FIG. 4, while an image is displayed on the display unit 451, the controller 480 may perform image capturing in response to a request for capturing an image. Such image capturing request may be applied by a voice command, by the user's gesture, through the user's manipulation of the user input units 423*a* and 423*b*, or the user's manipulation of the frame 410. In response to the user's request, the controller 480 may perform an image capturing function separately from the function of outputting the image 511 to the display unit 451. If an image is output in response to the image capturing request, the controller 480 may output to the display unit 451 the image captured in response to the image capturing request, instead of the image 511 output before the image capturing request is made. Accordingly, the user may receive the latest captured image. As described above, various changes may be made to the function of outputting an image in response to a touch on the frame in the glasses-type mobile terminal.

A method for providing various functions relating to outputting images by using the user's gesture is now described with reference to the accompanying drawings. FIGS. 5A, 5B, 5C, and 5D are conceptual views illustrating a method for providing an image based on a user's motion.

A sensing unit 140 may sense the motion of the user's head. More specifically, the sensing unit 140 may be configured to include an acceleration sensor, a magnetic sensor, a gravity sensor (G-sensor), a gyroscope sensor, or a motion sensor. The sensing unit 140 may sense the motion of the user wearing the glasses-type mobile terminal. Thus, the sensing unit 140 may be configured to sense the glasses-type mobile terminal's motion corresponding to the user's motion.

The controller 480 may control the images captured through the camera using the motion information of the user. As an example, the controller 480 may scroll the captured image output to the display unit 451. The controller 480 may control the display unit 451 so that a first captured image output to the display unit 451 switches to a second captured image or a third captured image corresponding to the user's motion. For example, the user may shift the image output to the display unit 451 by simply turning his head.

Figure 5A:
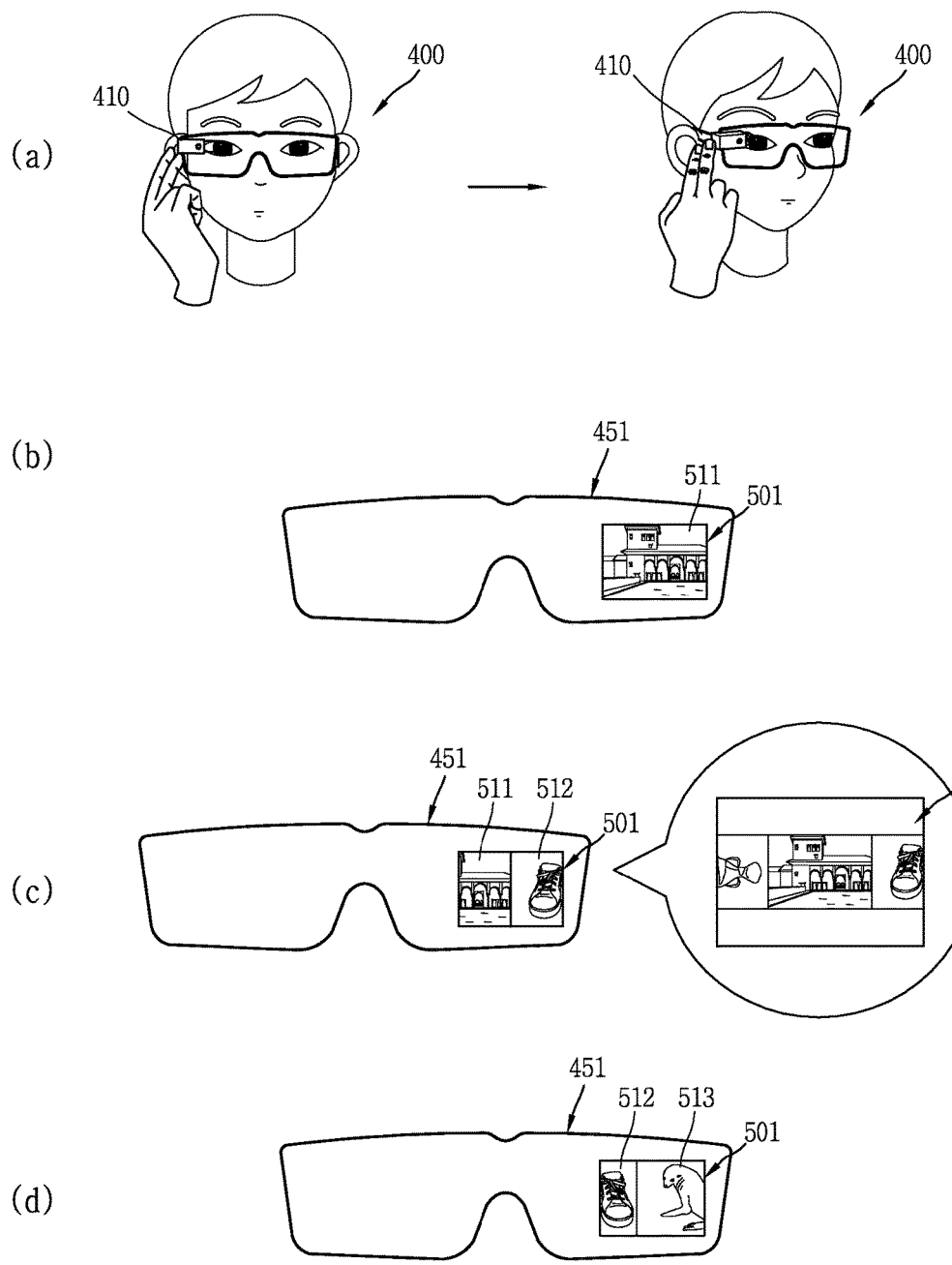

For example, if a predetermined type of touch is applied to the frame 410 as shown in FIG. 5A(a), the controller 480 outputs an image 511 captured through the camera 421 as shown in FIG. 5A(b). Here, the image 511 may be the image most recently captured. For convenience, the image 511 is referred to herein as a first image.

The controller 480 continues to output the first image 511 on the display unit 451 while the touch on the frame 410 is maintained. If the user's head moves in a direction as shown in FIG. 5A(a), the controller 480 may scroll the first image 511 in a direction as shown in FIG. 5A(c) and (d). In other words, when sensing a motion of the user, the controller 480 performs a scrolling function shifting the image output to the display unit 451 in a direction according to the sensed information. The scrolling of the image (or the first image 511) may be performed within the predetermined region 501.

In some embodiments, the controller 480 outputs a second image 512 different from the first image 511 on the display unit 451 based on the user's motion of rotating his head. Here, the first image 511 is displayed in the predetermined region 501 on the display unit 451 and shifts in a direction within the predetermined region according to the user's motion. The second image 512 is gradually displayed in the predetermined region as the first image moves. The second image 512 may be an image captured just prior to the first image 511, or just after the first image.

The controller 480 may sequentially move the images while the motion continues. That is, as the second image 512 shifts, a third image 513 may be output. The controller 480 may scroll the images previously captured in the predetermined region 501 according to the motion. Accordingly, the user may be provided with a function of searching for captured images by simply moving his head.

In another example, as shown in FIG. 5A(c), the images 530 may be displayed to not fully cover the predetermined region 501 while the scrolling function is performed. In this case, the images 530 may be shown like a filmstrip.

Further, although not shown, the controller 480 may control the scrolling speed according to a moving speed of the user's head. That is, the moving speed of the images may vary depending on the rotation speed of the user's head.

In other embodiments, the glasses-type mobile terminal may continue scrolling the images even when the user's head stops moving. When the user's motion satisfies a reference condition, the controller 480 may determine that the user intends to keep scrolling the images. More specifically, the controller 480, as shown in FIGS. 5B(a)(a1) and (a2), (b), and (c), shifts the images output in the predetermined region 501 as the user's head moves. In case the rotating distance of the user's head meets a reference value as shown in FIGS. 5B(a)(a1), (a2), and (a3), even when the user's head stops moving, the controller 480 may continue to scroll the images as shown in FIG. 5B(d). Such function may be referred to as an "auto scrolling function." In other words, the controller 480 may conduct the auto scrolling function based on the motion of the user's head. Although the discussed example in which the condition to trigger the auto scrolling function is associated with the rotating distance of the user's head, the present invention is not limited thereto. For example, the condition may be associated with other motions or multiple motions. For example, the motion condition to perform the auto scrolling function may be associated with the moving speed of the user's head. As another example, the motion condition may be associated with both the rotating distance and rotating speed of the user's head.

Further, the auto scrolling function may be performed by other triggers, not by the motion of the user's head. For example, the controller 480 may perform the auto scrolling function when a touch associated with the auto scrolling function is applied to the frame 410. The auto scrolling function may also be terminated based on the user's motion. For example, while the auto scrolling function is conducted as the rotating distance of the user's head meets a reference value, as shown in FIG. 5C(a), when the user's head shifts in an opposite direction of the initial direction of movement of the user's head, the controller 480 may terminate the auto scrolling function.

In the discussed example, the condition regarding the user's motion to terminate the auto scrolling function is associated with the moving direction of the user's head. However, the present invention is not limited thereto. For example, the condition may be associated with multiple motions. The motion condition to terminate the auto scrolling function may also be associated with the moving speed of the user's head. As another example, the motion condition may be associated with both the rotating direction and rotating speed of the user's head, such that when the motion of the user's head changes to the opposite direction at a predetermined speed or more, the controller 480 may terminate the auto scrolling function.

Figure 5C:
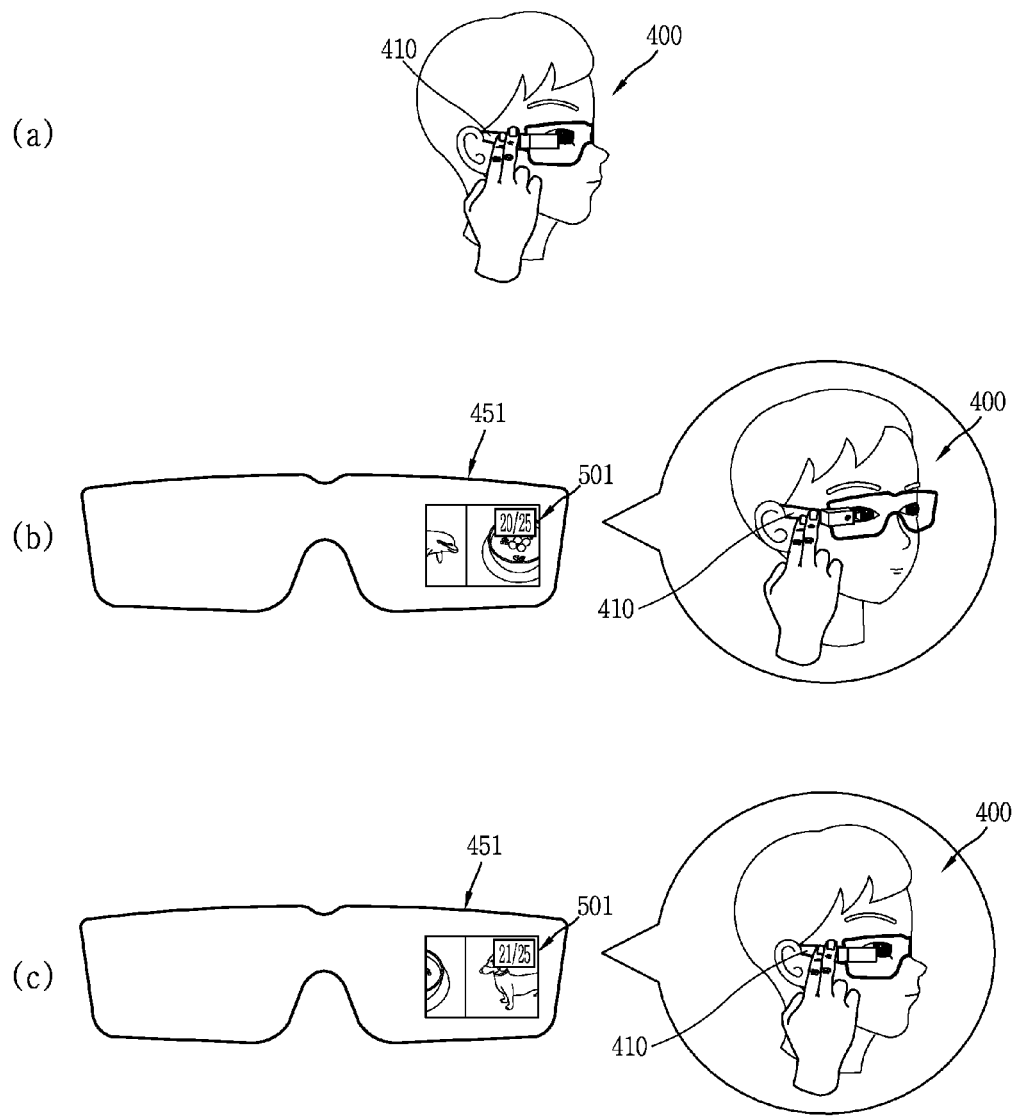

In an embodiment, after the auto scrolling function is terminated when the user's head is oriented back to the original direction as shown in FIG. 5C(c), the controller 480 may again scroll the image output to the display unit 451.

The glasses-type mobile terminal may also control the scrolling direction of the images according to the rotating direction of the user's head. For example, the controller 480 may control the moving direction of the images so that the moving direction of the images when the user's head moves in a first direction as shown in FIG. 5D(a) is different from the moving direction of the images when the user's head moves in a second direction as shown in FIG. 5D(b).

Figure 5D:
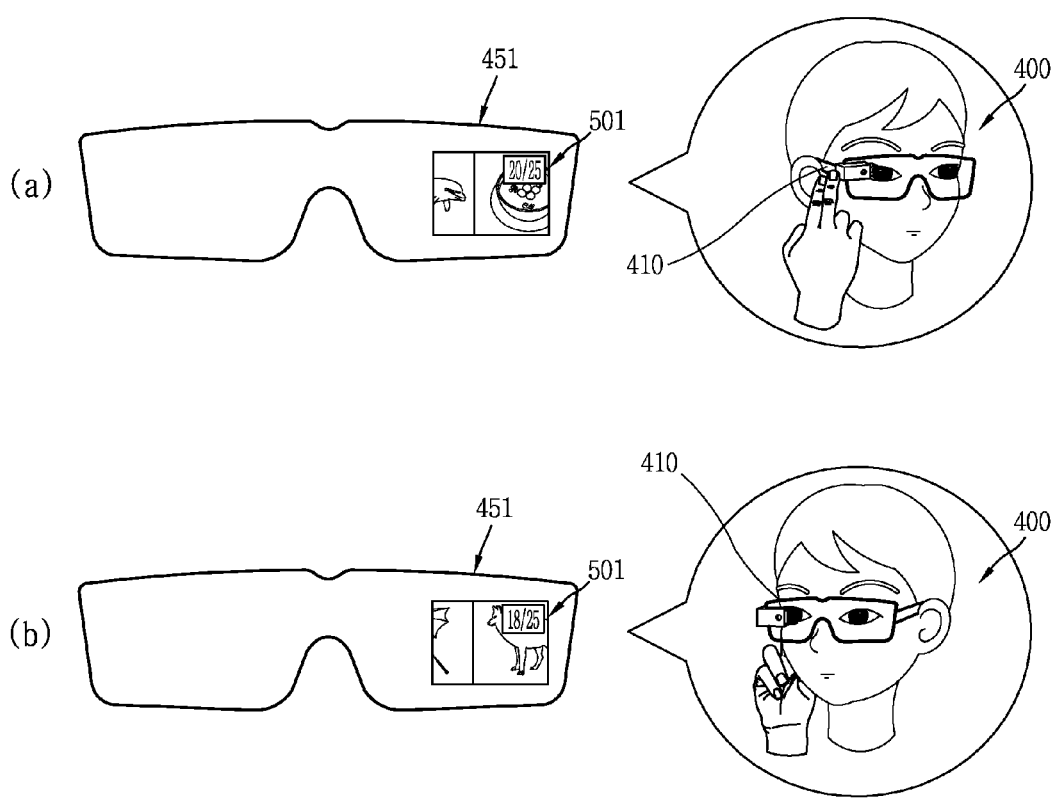

For example, in case the user's head moves in a a left direction, as shown in FIG. 5D(a), the controller 480 may shift the images to the left with respect to the view direction of the user. In case the user's head is oriented in a right direction, as shown in FIG. 5D(b), the controller 480 may shift the images to the right with respect to the view direction of the user.

As another example, when the user's head shifts in a first direction as shown in FIG. 5D(a), the controller 480 scrolls the images to output images captured earlier than the currently output images, and when the user's head shifts in a second direction as shown in FIG. 5D(b), the controller 480 may scroll the images to output images captured later than the currently output images.

Figure 6C:
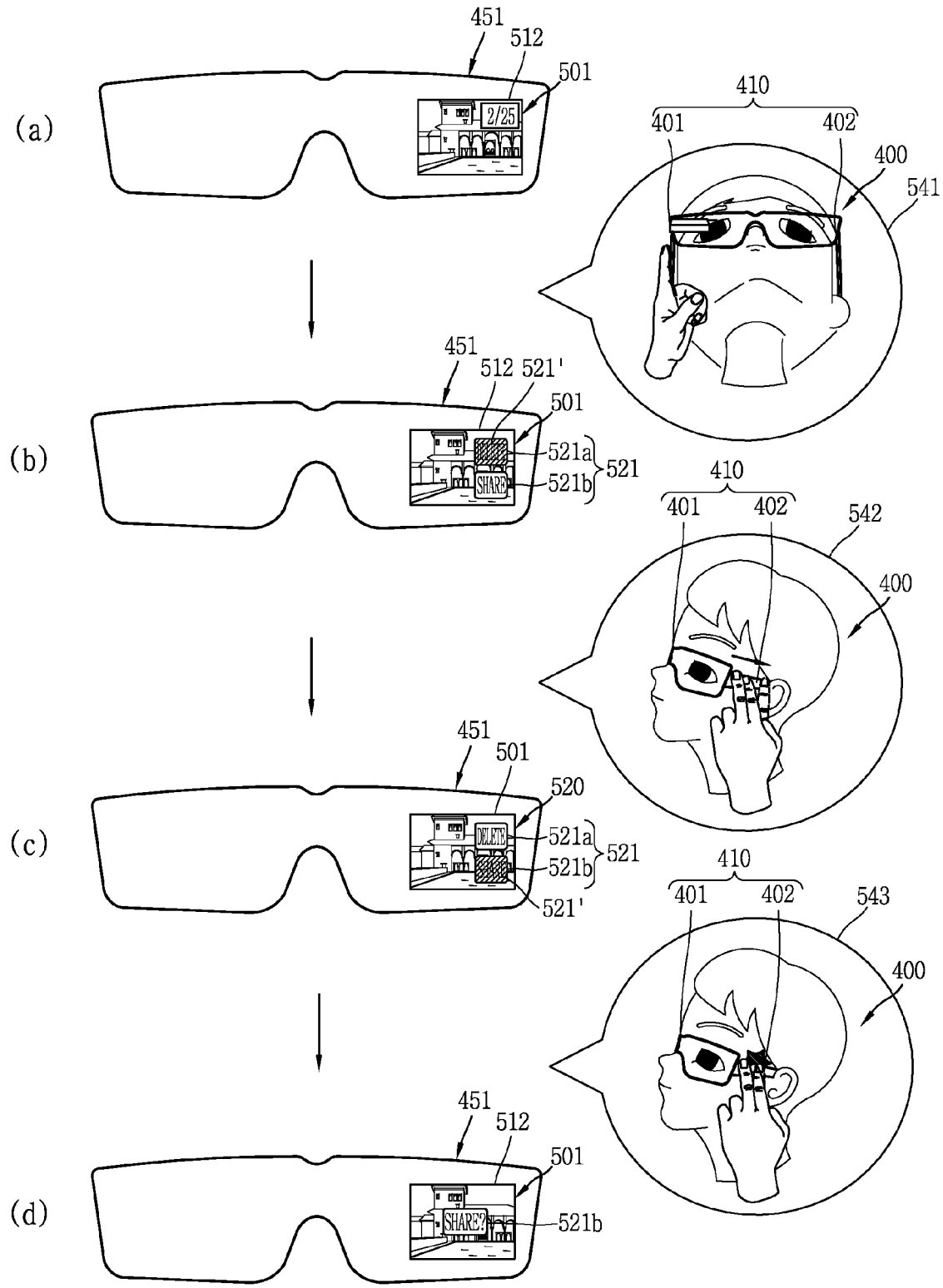

A method for providing an image-related function or information utilizing a user's motion is now described with reference to the accompanying drawings. FIGS. 6A, 6B, and 6C are conceptual views illustrating a method for providing image-related information in a glasses-type mobile terminal according to an embodiment of the present invention.

In an example, when the user's head moves in a particular direction while wearing the glasses-type mobile terminal 400, the glasses-type mobile terminal 400 may perform a function associated with the motion in the particular direction. When the motion of the user's head corresponds to a predetermined motion, the controller 480 may determine that the user's head has moved in the particular direction.

Various functions associated with the motion in the particular direction may be defined. A function based on the user's selection among the various image-related functions, may be performed corresponding to the motion in the particular direction. The user may select a function to be conducted in the glasses-type mobile terminal, by moving the user's head in a particular direction.

Further, the function that was performed corresponding to the motion in the particular direction may be terminated corresponding to the user's head being moved in an opposite direction of the particular direction. The controller 480 may execute or terminate the function corresponding to the motion of the user's head. Further, in other embodiments the function might not be terminated corresponding to the motion in the opposite direction of the particular direction, and instead the controller 480 may control the display unit 451 so that the screen information corresponding to the function is merely removed from the display unit 451.

The image-related function may be a function providing image-related information, an additional function of utilizing an image, or for selecting other functions to be performed in connection with an image. Here, the image-related information may include the time and place of image capturing, the folder containing the image, category of the image, or information corresponding to the object included in the image.

Further, the additional function of utilizing the image may include a function that may be performed using the image, such as transmitting, sharing, editing, or deleting the image, and the like.

Further, the function may also include outputting a list containing items respectively corresponding to additional functions so that any one of the additional functions is selected.

Meanwhile, as described above, in case the motion of the user's head corresponds to a predetermined motion, the controller 480 may determine that the user's head has moved in a particular direction. Here, the predetermined motion may correspond to a motion when the user lifts his head, as shown in FIGS. 6A(a) and (b). As shown, when the user raises his head, the controller 480 may determine that the user's head or the glasses-type mobile terminal put on the user's head has moved in a particular direction. In this case, the controller 480, as shown, may conduct a function associated with the output image.

The controller 480 may perform the additional function while a touch on the frame part 410 maintained, as described above in connection with FIGS. 3 and 4. When the touch on the frame 410 is released while the image 515 and additional function are provided, as shown in FIG. 6A(b), corresponding to the user's head having been moved in the particular direction, the controller 480 may terminate both the additional function and the output of the image 515.

The additional function may be a function of providing information 520 relating to the output image 515. Such related information may be output overlapping at least a portion of the image 515 as shown. Further, although not shown, the controller 480 may control the display unit 451 so that the related information does not overlap the region 501 in which the image 515 is output.

The related information may include information relating to the image. Further, if a plurality of images are output in the predetermined region 501, the controller 480 may output all of the information relating to each of the plurality of images or may provide information on only one of the plurality of images. In this case, the controller 480 may provide information occupying a larger area in the predetermined region 501. Meanwhile, as described above, the image output in the predetermined region 501 need not be the latest captured image.

In an embodiment, when the user's head shifted in a particular direction as shown in FIGS. 6A and 6B(a), then moved in an opposite direction of the particular direction as shown in FIG. 6B(b), the controller 480 may terminate outputting the related information. As such, the user may intuitively control the execution and termination of the related information through the head motion.

In another embodiment, the controller 480 may perform a specific function corresponding to the touch on the frame 410. As an example, in the glasses-type mobile terminal when a function is to be performed in connection with an image, the controller 180 may output a list 521 for selection of any one of the additional functions corresponding to the user's head moving in a particular direction as shown in FIGS. 6C(a) and (b). The list 521 may contain items 521A and 521B respectively corresponding to the additional functions. Any one of the items 521A and 521B may be chosen through a touch on the frame part 410.

More specifically referring to FIGS. 6C(a)-(d), if the user's head moves in a particular direction, the controller 480 outputs a list 521 indicating functions relating to the captured image 512. The list 521 includes selectable items 521A and 521B corresponding to functions relating to the captured image, and as shown in FIGS. 6C(b), (c), and (d), at least one of the items 521A and 521B may be selected through a touch on the frame 410. The frame 410 may be touched in various manners to select at least one of the items.

Further, the touch may be performed at various positions to select at least one of the items.

By way of example, the controller 480 may specify any one of the plurality of items based on a dragged touch on the frame 410 as shown in FIGS. 6C(b) and (c). That is, the user may determine a final item to be selected among the plurality of items by utilizing a touch on the frame 410. A dragged touch input may also be used to navigate. Further, at least one of the items may be selected based on a predetermined type of touch on the frame 410 (e.g., a double touch on the frame part 410), as shown in 543 and (d) of FIG. 6C. The touch to perform navigating on the items and the touch to select an item may be continuous with the first touch to output an image to the display unit or an additional touch applied separately from the first touch.

In case the navigating touches are continuous with the first touch, even when the first touch is released from the frame 410 due to the touches, the controller 480 may continue outputting the image. If a touch is re-applied to the frame 410 within a predetermined time after the first touch has been released, the controller 480 may continue outputting the image on the display unit 451.

As another example, the frame 410 includes a first frame portion 401 (refer to FIG. 2A) coupled with a first side of the display unit 451 and a second frame portion 402 (refer to FIG. 2A) coupled with a side opposite the first side. When sensing a first touch on the second frame portion 402 while a predetermined type of touch for outputting an image is applied to the first frame portion 401, the controller 480 may allow a guide image 521' to overlap any one of the selectable items (refer to 542). In other words, the controller 480 may guide the user to select a corresponding item by making the guide image 521' overlap a to-be-selected item. Meanwhile, when sensing a second touch on the second frame portion 402, which is different from the first touch (refer to 543), the function corresponding to the selectable item overlapping the guide image may be performed.

The controller 480 may shift the guide image 521' along a dragged touch (indicated with reference numeral 542) on the second frame portion 402, which is continuous with the first touch, as shown in FIGS. 6C(b) and (c).

Although not shown, the list may disappear from the display, corresponding to the user's head moving in an opposite direction of the particular direction. As described above, the glasses-type mobile terminal may utilize the user's motion and a touch on the frame to provide various functions relating to the captured image.

Figure 7A:
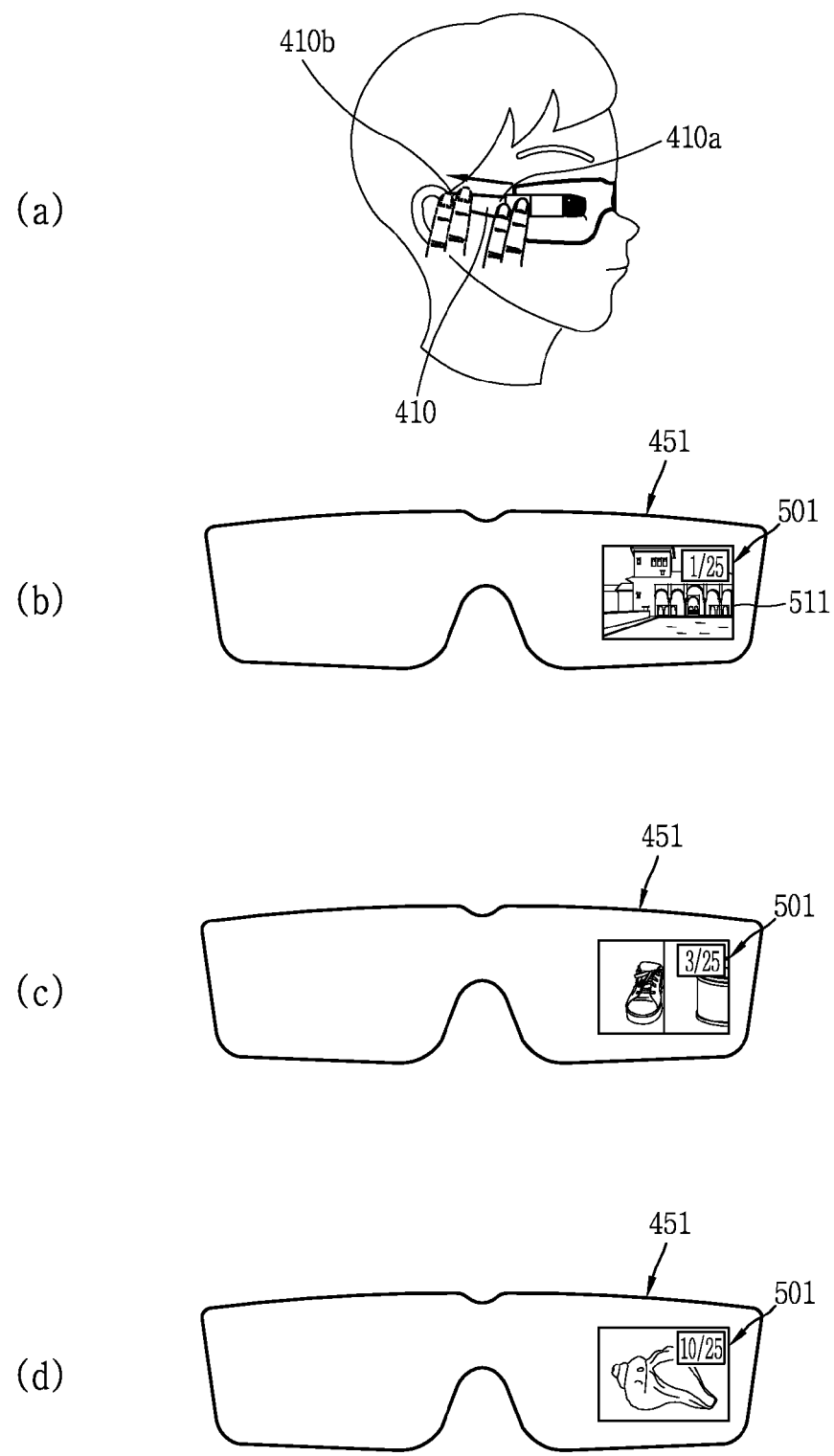
FIGS. 7A and 7B are conceptual views illustrating a method for providing an image based on a touch on a frame part of a glasses-type mobile terminal according to an embodiment of the present invention.
Figure 7B:
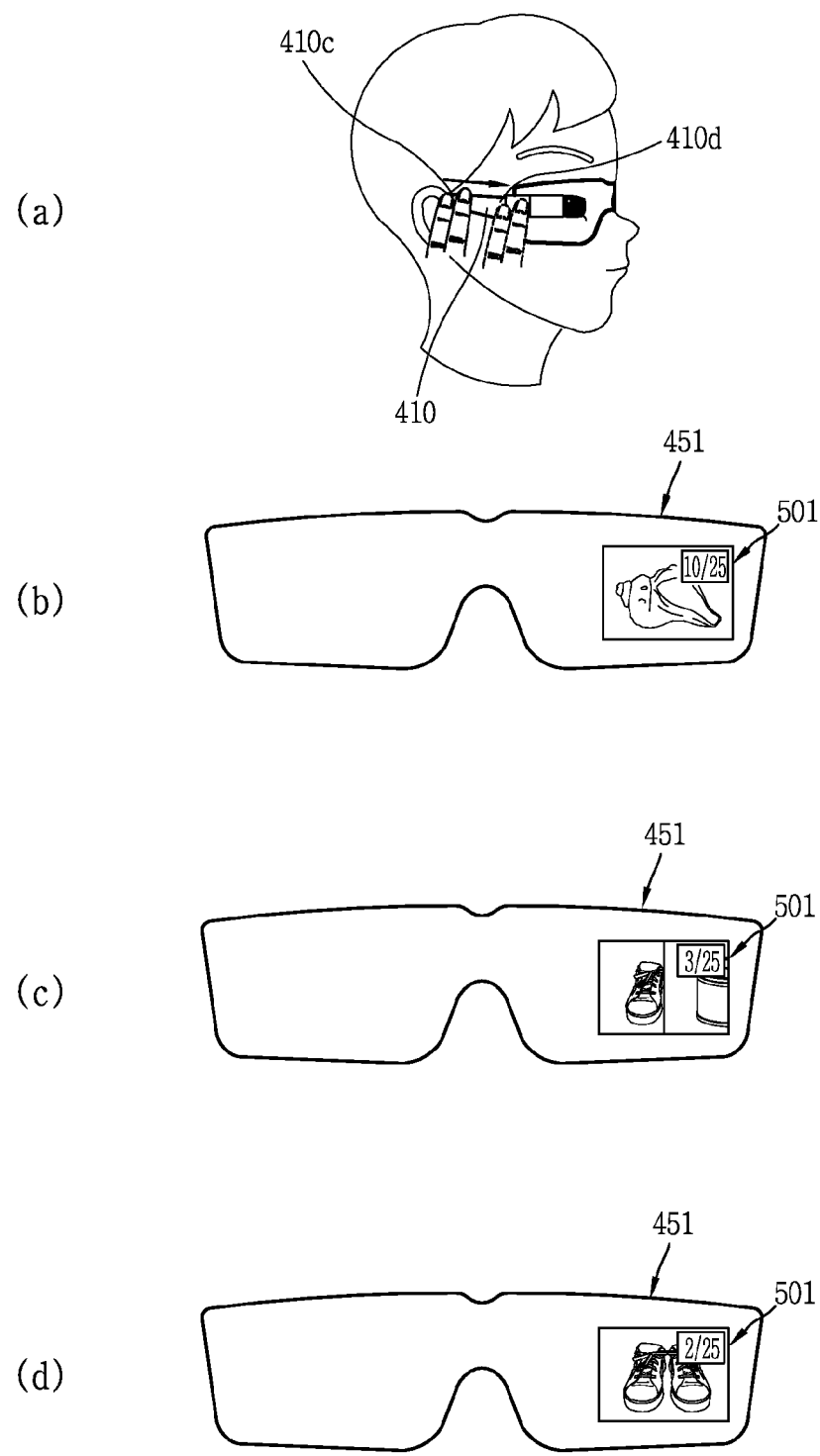

In other embodiments, a method for controlling images output to the display unit and providing the functions relating to the images utilizing touches on the frame may be provided. FIGS. 7A and 7B are conceptual views illustrating a method for providing an image based on a touch on a frame of a glasses-type mobile terminal according to the present invention.

According to embodiments of the present invention, the touches for scrolling an image output to the display unit 451 may include a touch continuous with a first touch for outputting an image, or may be an additional touch applied separately from the first touch. When the touches are continuous with the first touch, even when the first touch is released from the frame 410, the controller 480 may continue outputting images. If a touch is re-applied to the frame 410 within a predetermined time after the first touch has been released, the controller 480 may continue outputting the image on the display unit 451.

In another example, the controller 480 may provide the function of scrolling an image, corresponding to a first touch on the first frame portion. During this time, the first touch on the first frame portion 401 may be maintained. Further, when the first touch on the first frame portion 401 is released, the controller 480, even when a touch on the second frame 402 is maintained, may terminate providing a captured image to the display unit 451. In another example, the controller 480 may maintain the function of providing the captured image to the display unit 451 if the touch on the second frame portion 402 is maintained even when the first touch on the first frame portion 401 is released.

An example method for scrolling an image utilizing a touch on the frame 410 is now described. By way of example, the controller 480 may scroll a captured image output to the display unit 451 as shown in FIGS. 7A(b), (c), and (d), corresponding to a predetermined type of touch on the frame 410 (for example, a touch that is dragged from a point 410A of the frame part 410 to another point 410B) as shown in FIG. 7A(a). The controller 480 may control the display unit 451 so that a first image switches to a second image or third image different from the first image according to the predetermined type of touch. In other words, the user may move the image output to the display unit 451 only by moving his finger on the frame 410.

The controller 480 may perform a scrolling function to allow a plurality of images to be sequentially output when sensing a dragged touch on the frame 410, with any one of the plurality of images captured through the camera, corresponding to the touch on the frame 410, as shown in FIGS. 3 and 4.

As described above, the controller 480 may output an image in a predetermined region 501 of the display unit 451. Accordingly, scrolling the first image output to the display unit 451 may be performed within the predetermined region 501.

The first image 511 moves in a direction within the predetermined region according to the dragged touch, and an image different from the first image is gradually displayed in the predetermined region as the first image shifts.

Here, the image 512 may be an image captured through the camera earlier than a capture time of the first image 511. The controller 480 may gradually shift the images captured earlier than the first image 511 while the dragged touch is maintained. As such, the controller 480 may scroll the images captured in the past within the predetermined region 501, corresponding to the dragged touch. Accordingly, the user may be provided a function of searching for the captured images by simply moving his finger on the frame.

Further, the controller 480 may control the scrolling speed corresponding to the moving speed of the user's finger or other object that applies the dragged touch, when scrolling the images. In other words, the moving speed of the images moving in the predetermined region 501 may vary depending on the touching speed of the dragged touch.

Meanwhile, the glasses-type mobile terminal may continue to perform the function of scrolling the images even when the dragged touch is terminated. Here, the "termination of the dragged touch" may mean when the finger or other object applying the dragged touch stops moving or when the finger applying the dragged touch is removed from the frame 410.

The controller 480 may determine that the user intends to continue shifting the images when the dragged touch satisfies a reference condition. Such function may be denoted an "auto scrolling function." The controller 480 may perform the auto scrolling function based on the touching speed of the dragged touch. In the above example, the condition for performing the auto scrolling function is related to the speed of the dragged touch. However, the present invention is not limited thereto. For example, the condition of the auto scrolling function may be associated with the length of the touch or a combination of the touching speed and length of the dragged touch.

In some embodiments, the auto scrolling function may be terminated when the dragged touch is applied in an opposite direction or when a predetermined type of touch associated with the termination of the auto scrolling function is applied.

The glasses-type mobile terminal may control the scrolling direction of the images according to the moving direction of the dragged touch. For example, when the dragged touch is applied in a first direction as shown in FIG. 7A the scrolling may be performed in a first direction, and the images may be scrolled in a second direction when the dragged touch is applied in a second direction opposite to the first direction, as shown in FIG. 7B(a).

Thus, when the dragged touch is applied in the first direction, e.g., in a direction away from the display unit 451, as shown in FIG. 7A, the controller 480 may output the images captured previously with respect to current image. Then when the dragged touch is applied in the second direction, e.g., in a direction approaching the display unit 451 as shown in FIG. 7B, the controller 480 may output the images captured after the currently output image. As such, the glasses-type mobile terminal may move the images or control the moving direction of the images by utilizing the touch on the frame. Thus the controller may perform different types of control corresponding to the different types of touches and may associate different functions with the different touches, and may perform a function corresponding to each touch.

FIGS. 8A, 8B, 9A, 9B, 9C, 10A, 10B, 10C, 11, and 12 are conceptual views illustrating a method for providing a function relating to a captured image utilizing a touch on a frame in a glasses-type mobile terminal according to another embodiment of the present invention.

The type of touches applied to the frame 410 is described with reference to FIG. 8A. The types of the touches described hereinafter are merely examples, and it will be apparent to those of ordinary skill in the art that there may be other various touches on the frame 410 than those described below.

Figure 8A:
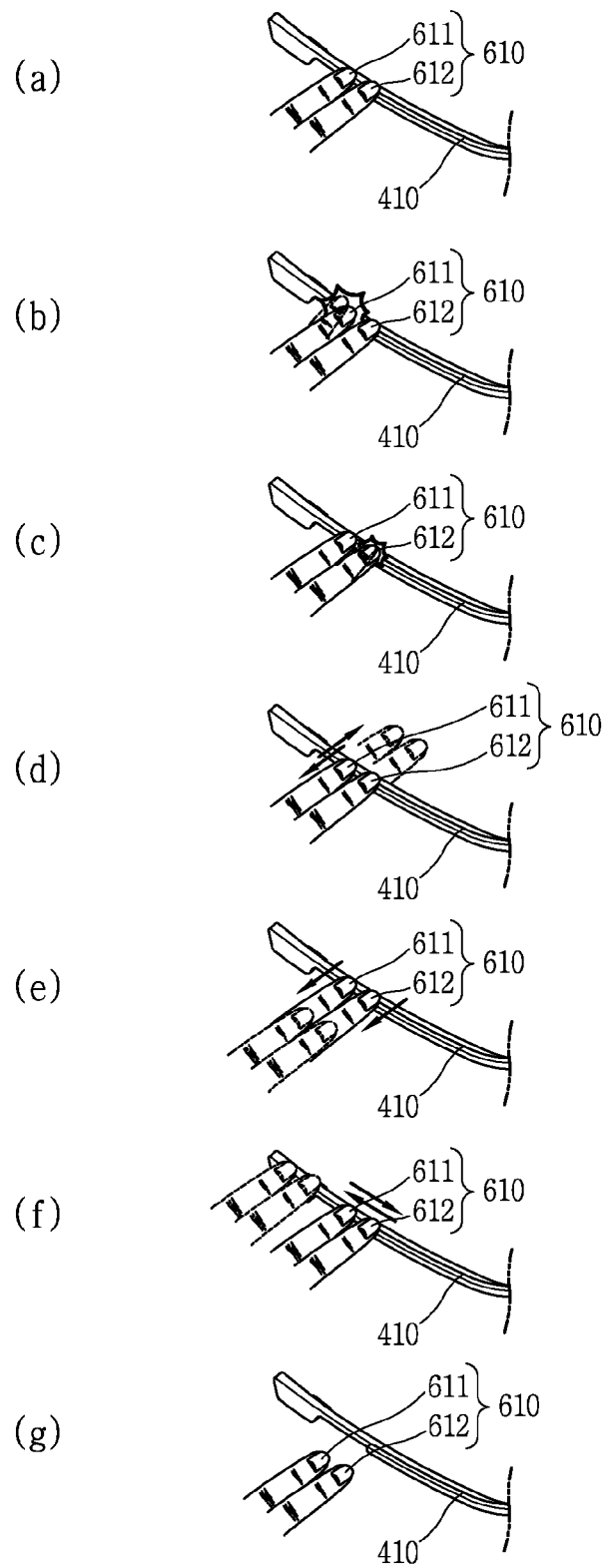

First, as shown in FIG. 8A(a), a first type of touch may be a multi-touch that is applied to at least two touching points, i.e., a plurality of touching points, on the frame. The multi-touch, as shown, may be conducted when at least two fingers 611 and 612 touch the frame 410 simultaneously. The controller 480 may output the latest captured image as described above in connection with FIGS. 3 and 4, corresponding to the plurality of fingers 611 and 612 touching the frame 410. In other words, the predetermined type of touch for outputting a captured image, as described above in connection with FIGS. 3 and 4, may be a touch on the frame 410 utilizing a plurality of fingers or other touching objects as shown in FIG. 8A(a).

Figure 8B:
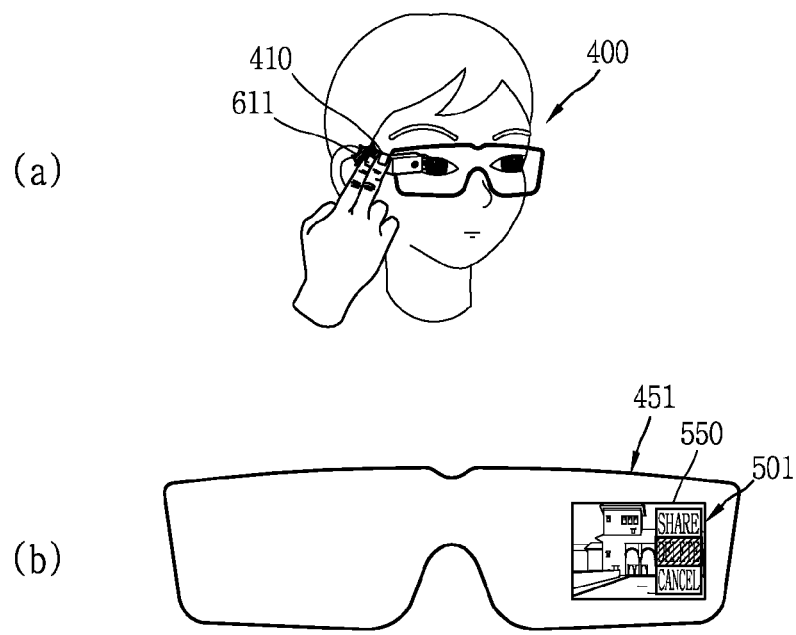

The second type of touch, as shown in FIG. 8(b), may be a tap that touches the frame 410 shortly after releasing any one 611 of the plurality of fingers. Here, the tap may be a single tap that contacts the frame 410 once or a multi-tap that contacts the frame 410 multiple times.

As an example, if the second type of touch is applied, the controller 480 may select the image being output on the display unit 451.

Figure 8C:
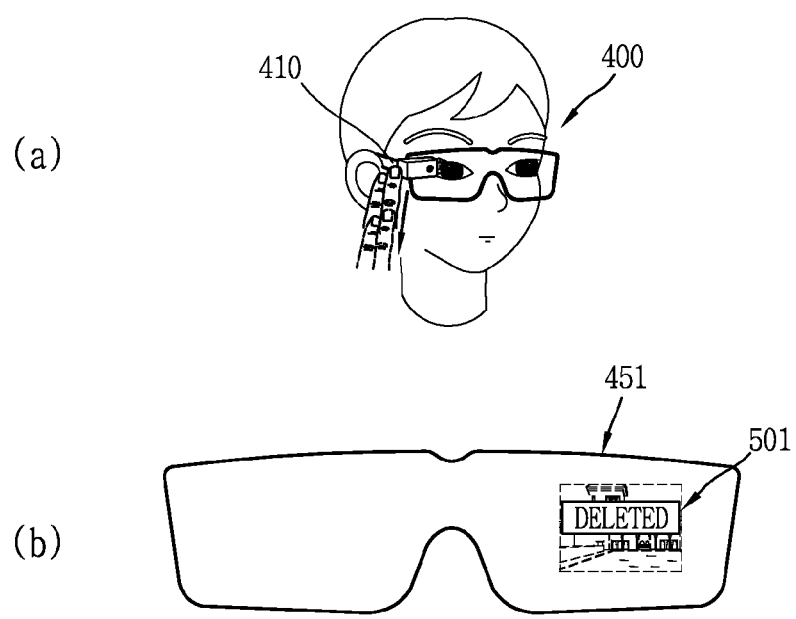

The third type of touch, as shown in FIG. 8(c), may be a tap that touches the frame part 410 shortly after releasing a second finger 612 other than the finger 611 described above in connection with FIG. 8A(b), among the plurality of fingers. Here, the tap may be a single tap that contacts the frame 410 once or a multi-tap that contacts the frame 410 multiple times.

As an example, if the third type of touch is applied, the controller 480 may release the selection of the image that has been chosen by the second type of touch.

The fourth type of touch, as shown in FIGS. 8A(d) and (e), may be a flicking touch on the frame 410 in a particular direction. Corresponding to the flicking touch, the controller 480 may delete or select the output image.

The fifth type of touch, as shown in FIG. 8A(f), may be a dragged touch on the frame 410. Corresponding to the dragged touch, the controller 480 may perform a scrolling function on the image, as described above.

The sixth type of touch, as shown in FIG. 8A(g), may be releasing the touch from the frame 410. Corresponding to releasing the touch, the controller 480 may terminate the function of outputting the image.

The glasses-type mobile terminal may perform various types of control on the output images, corresponding to various types of touches on the frame. Further, in addition to the above-described examples, the glasses-type mobile terminal may perform different types of control, depending on the touched positions on the frame and which one of the first frame portion and second frame portion has been touched.

Other examples of performing control related to an image output to the display unit utilizing a touch on the frame are now described. As an example, as shown in FIGS. 8B(a) and (b), the controller 480 may select any one of selectable items, corresponding to the above-described second type of touch on the frame, i.e., the tap touching the frame part 410 shortly after releasing any one finger 611 of the plurality of fingers. As shown, any one of the items included in the list 550 may be selected through the second type of touch. Although not shown, the shift between the items may be done corresponding to a dragged touch running at least one finger of the plurality of fingers on the frame 410.

As another example, as shown in FIG. 8c, the controller 480 may delete the image output on the display unit, corresponding to the fourth type of touch described above in connection with FIGS. 8A(d) and (e), i.e., the flicking touch on the frame 410 in a particular direction. In this case, the user may delete the image by simply performing a flicking touch on the frame.

Additionally, the controller 480 may change the order of outputting images depending on the touching positions of the frame 410. Here, the order of outputting images means an order in which the images are displayed according to a certain reference. For example, a plurality of images may be output on the display unit 451 in chronological or reverse chronological order according to the time when the images have been captured.

Figure 9A:
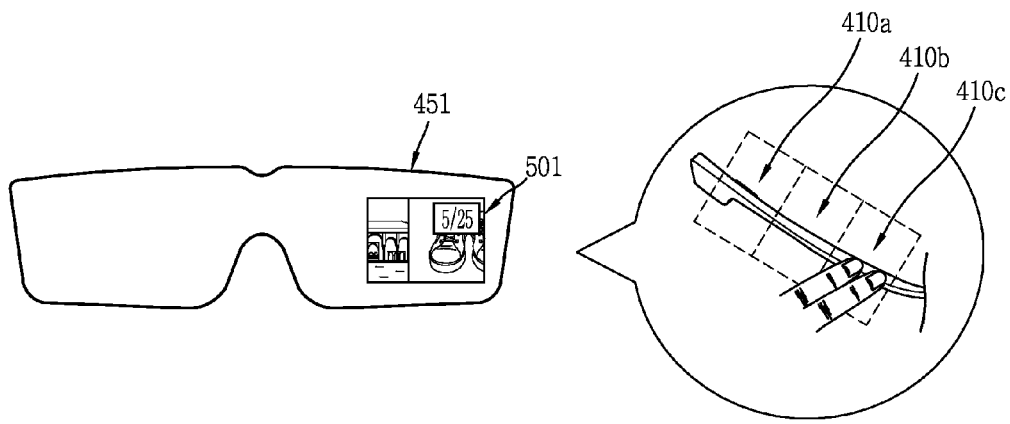
Figure 9B:
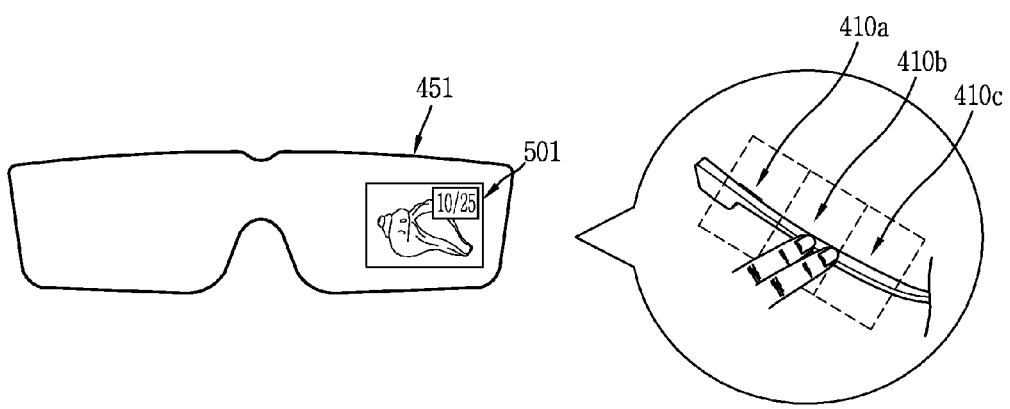
Figure 9C:
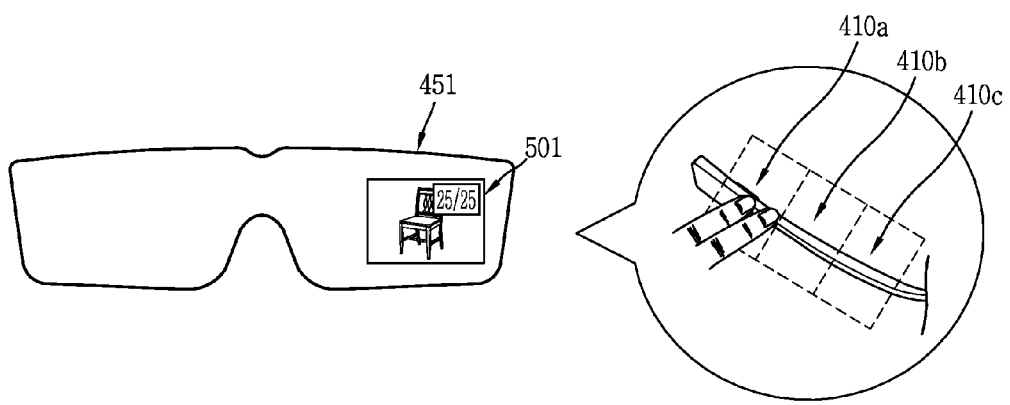

The user may also desire to output a specific image on the display unit 451 rather than sequentially outputting the images. Specifically, as shown in FIG. 9A, the frame 410 may be considered partitioned into a plurality of regions 410A, 410B, and 410C. The controller 480 may determine an image to be output, depending on which one of the plurality of regions 410A, 410B, and 410C has been touched.

As shown in FIG. 9A(a) when the first region 410C adjacent to the display unit 451 is touched, the controller 480 may control the display unit 451 so that an image according to the touch position is output, here an image in the beginning part of the image order. As shown in FIG. 9A(b), when the second region 410B corresponding to the middle part is touched, the controller 480 may control the display unit 451 so that an image corresponding to a middle part of the image order is output. As shown in FIG. 9A(c) when the third region 410C farthest from the display unit 451 is touched, the controller 480 may control the display unit 451 so that an image corresponding to a last part of the image order is output.

As such, the glasses-type mobile terminal according to an embodiment of the present invention may switch images that are to be output according to the touching positions on the frame. Accordingly, when many images are stored in the memory 170, the glasses-type mobile terminal may immediately output the images corresponding to the positions on the frame, rather than sequentially shifting the images, thus saving the user time searching for a desired image.

Figure 10A:
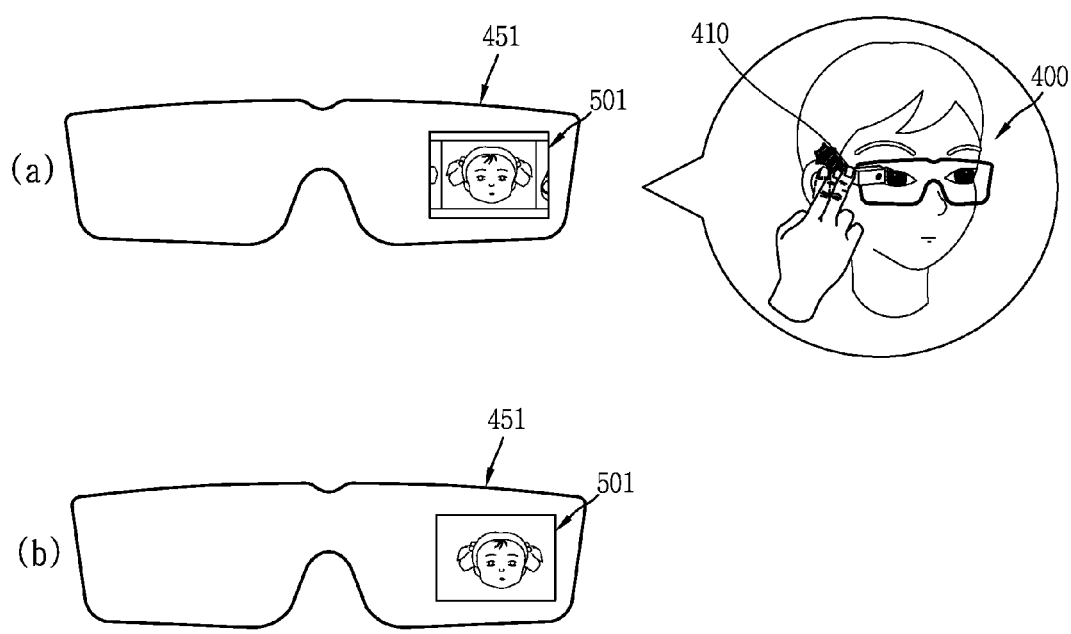

In other embodiments, the glasses-type mobile terminal may stop scrolling an image in response to a touch on the frame 410, as shown in FIG. 10A(a) in order to output a particular image on the display unit 451. Here, the particular image may be the image that is occupying the largest area on the display unit 451 when the touch is applied.

The glasses-type mobile terminal may output the images so that the images are smaller in size than a predetermined region 501 while an image is scrolled. In such case, the controller 480 may output only the particular image on the overall predetermined region 501 as shown in FIG. 10A(b) in response to the touch. In an example, the predetermined type of touch may be a double touch on the frame 410 or a double or single tap by any one of the plurality of fingers that touched the frame 410.

Figure 10B:
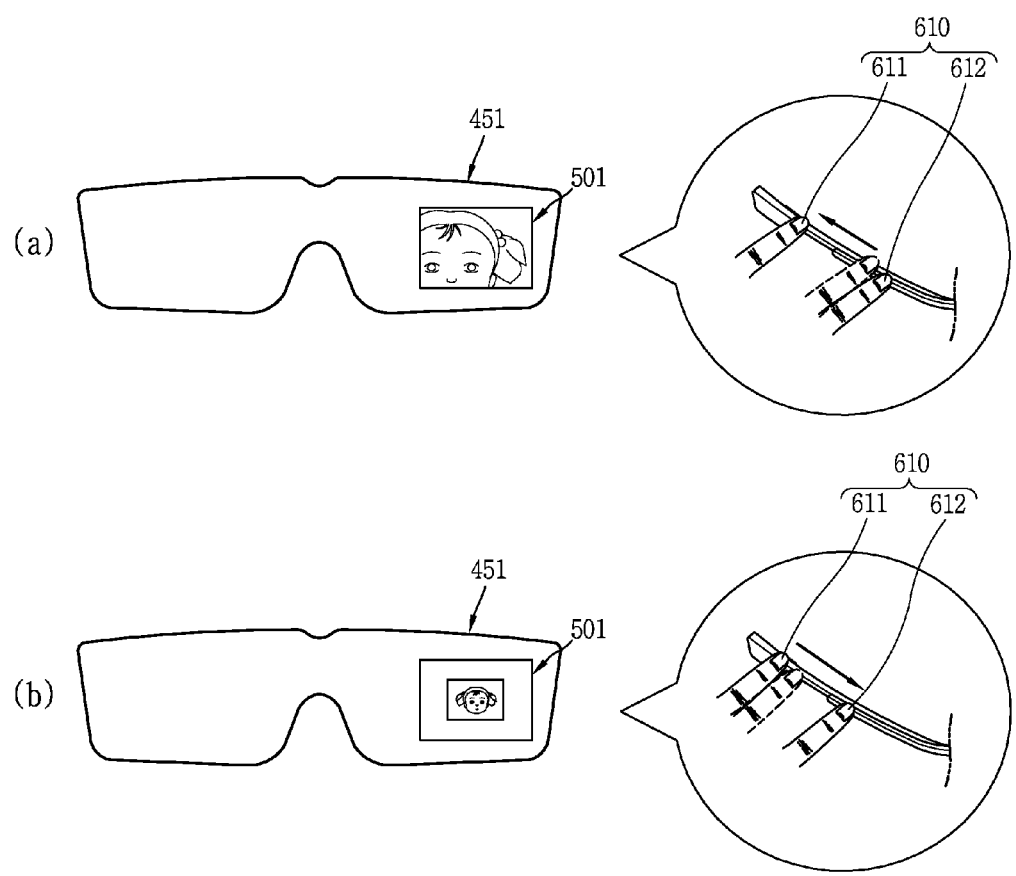
Figure 10C:
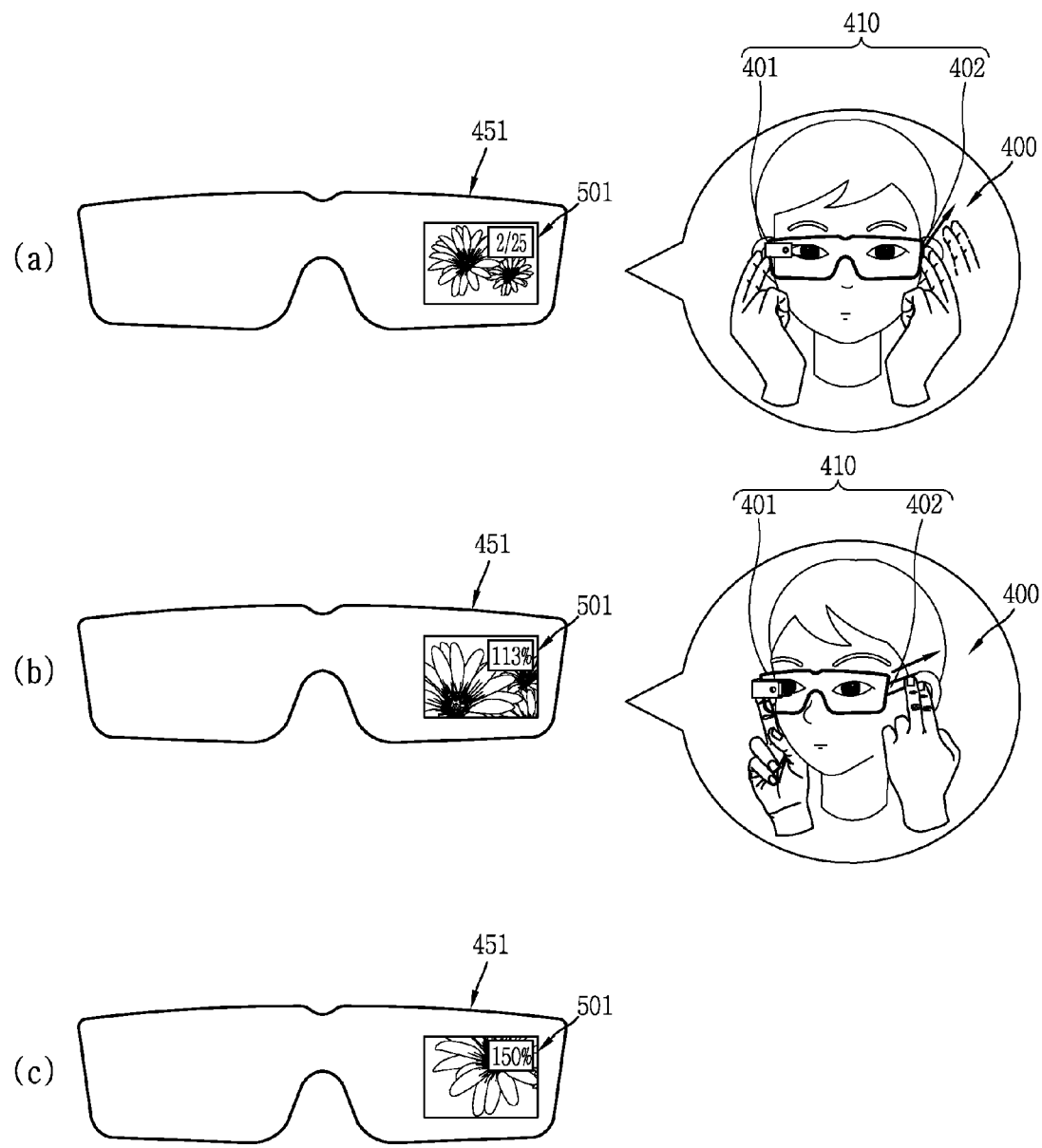
Figure 11:
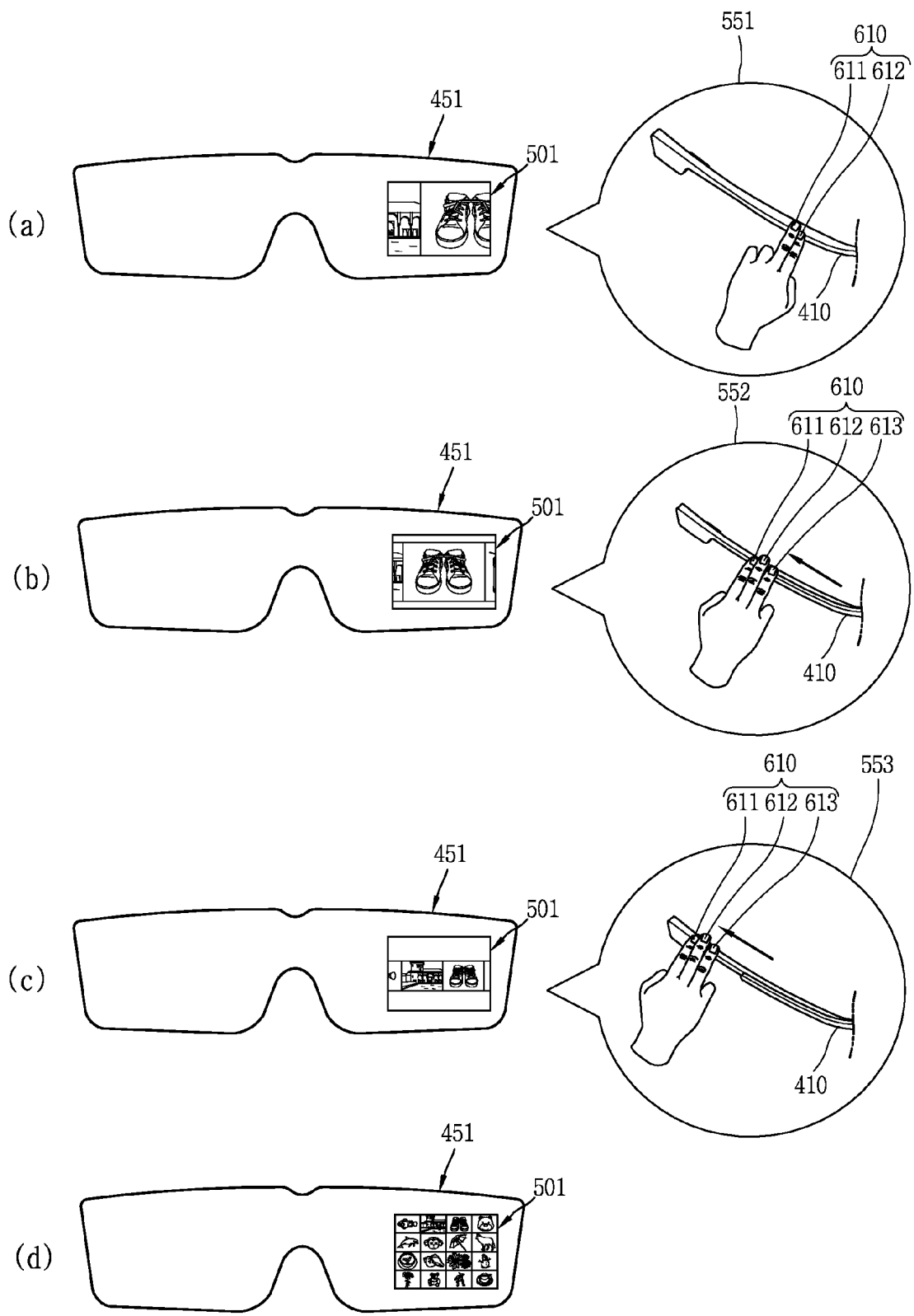

As another example, the glasses-type mobile terminal may adjust the size of the image output to the display unit 451 in response to the touch on the frame as shown in FIGS. 10B, 10C, and 11. Thus, when a touch relating to adjusting the size of the output image is applied to the frame, the controller 480 may zoom in or zoom out of the image output to the display unit 451.

As an example, the controller 480 may zoom in on the output image when a dragged touch is applied to the frame 410 in a direction as shown in FIG. 10(a) and may zoom out of the output image when a dragged touch is applied to the frame 410 in an opposite direction as shown in FIG. 10B(c). In this case, the controller 480 may gradually zoom in or zoom out of the image as the dragged touch is applied. The dragged touch may be done through the motion of any one 611 or 612 of the plurality of fingers 610 that touched the frame 410. Further, the dragged touch may be applied with all of the plurality of fingers 610 on the frame 410. In this case, the dragged touch may be continuous with the touch first applied to the frame 410 to output an image as described above in connection with FIGS. 3 and 4.

As another example, the controller 480 may zoom in or zoom out of the image output to the display unit 451 in response to a dragged touch applied to second frame portion after a touch has been applied to a first frame portion to output an image as shown in FIG. 10C.

The controller 480 may determine whether to zoom in, zoom out, (magnify or shrink) the image depending on the direction of the dragged touch on the frame 402.

Further, the controller 480 may also zoom in or zoom out of the image output to the display unit 451 as shown in FIGS. 11(a) and (b) while scrolling through a plurality of images as shown in FIGS. 11(c) and (d).

Here, the predetermined type of touch may include a touch on a plurality of points of the frame 410 and a dragged touch continuous with the touch on the plurality of points. The controller 480, as the dragged touch is applied, may gradually zoom out of an image while outputting other images. In this case, the controller 480, when the length of the dragged touch is longer than a reference distance, may zoom out of the captured image while simultaneously outputting other images, as shown in FIGS. 11(c) and (d).

Although not shown, an additional function may be to provide information relating to the output image in response to the touches. Such related information may include the time and place of the image capturing, the format and size of the captured image, and information on the object included in the image. Meanwhile, the related information may disappear from the display unit 451 as the touch for performing the additional function is released. Here, the touch may be the touch applied to a side other than the side to which the first touch has been applied to output an image, as described above in connection with FIGS. 3 and 4.

Figure 12:
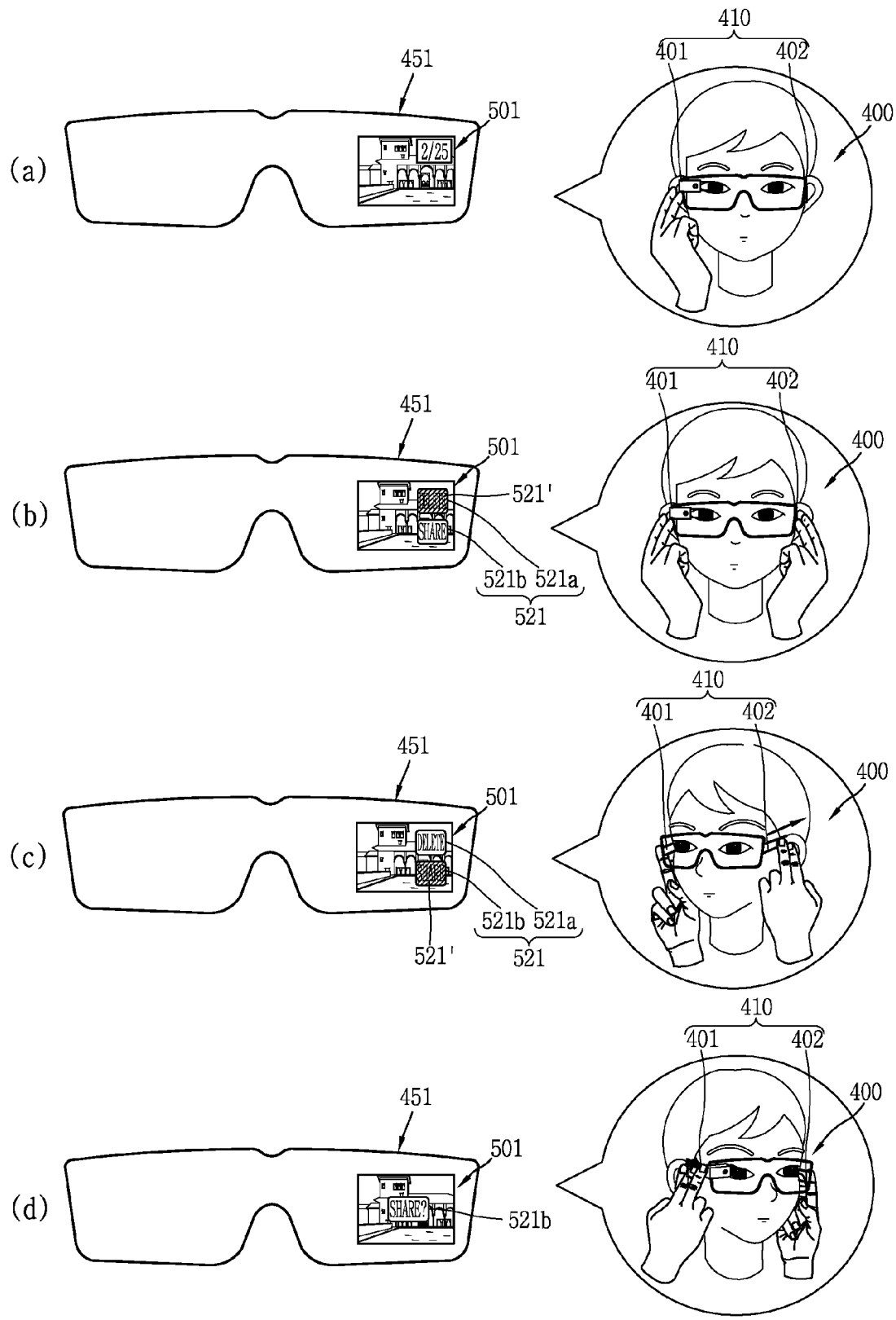

Similar to the embodiments previously discussed, the controller 480 may output a list 521 for selection of an additional function relating to an image in response to a dragged touch on the frame as shown in FIGS. 12 (a) and (b). Further, the items 521A and 521B included in the list 521 may be selected based on a touch on the frame.

By way of example, the glasses-type mobile terminal may output the list 521 for selection of the functions relating to an image while the first touch on a frame is maintained, or a touch is applied to another frame (for example, the second frame 402) as shown in FIGS. 12(a) and (b). The list 521 may contain the items 521A and 521B corresponding to related functions.

Any one of the items 521A and 521B may be selected through a touch on the frame 410 as shown in FIG. 12(d). The touch for selecting the items 521A and 521B may be a touch on the first frame portion 401 to which the first touch was applied, as shown in FIG. 12(d). Various embodiments are considered for the type of the touch applied to select the items and the frame touched to select the items.

The items may be specified based on a dragged touch on the frame 410 (for example, the second frame portion 402), as shown in FIGS. 12(b) and (c). In other words, the user may determine an item to be selected among the plurality of items 521A and 521B by utilizing a touch on the frame 410, including a dragged touch for navigation. As described above, the touch for navigation and the touch for selection may be a touch continuous with the first touch for outputting an image on the display unit or an additional touch applied separately from the first touch.

When the touches are continuous with the first touch, even when the first touch is released from the frame 410, the controller 480 may continue to output the image accordingly. For example, the controller 480 may continue outputting the image on the display unit 451 if a touch is re-applied to the frame 410 within a predetermined time after the first touch has been released.

As another example, when sensing a touch on the second frame portion 402 with a predetermined type of touch (or the first touch) applied for outputting the image applied to the first frame portion 401, the controller 480 may allow a guide image 521' to overlap the items to indicate the user's selection of an item. As shown in FIG. 12(c), the guide image may shift between the items 521A and 521B in response to a dragged touch on the second frame portion 402.

In yet another embodiment, the glasses-type mobile terminal may provide a function of selecting images so that a particular function may be performed on all of the selected images. For example, the controller 480 may, en bloc, delete and transmit the selected images or relocate the selected images to a certain folder. Further, the controller 480 may provide a function that allows the selected images to be temporarily stored in a particular folder and to be then output to the display unit sequentially or all together, per the user's request. In other words, the glasses-type mobile terminal may offer a function of selecting at least some of a plurality of images, so that a particular function may be simultaneously performed on the selected images. The images may be selected in various manners, such as a touch on the frame or the user's motion.

FIGS. 13A, 13B, 13C, 13D, and 13E are conceptual views illustrating a method for selecting images in a glasses-type terminal according to an embodiment of the present invention.

Figure 13A:
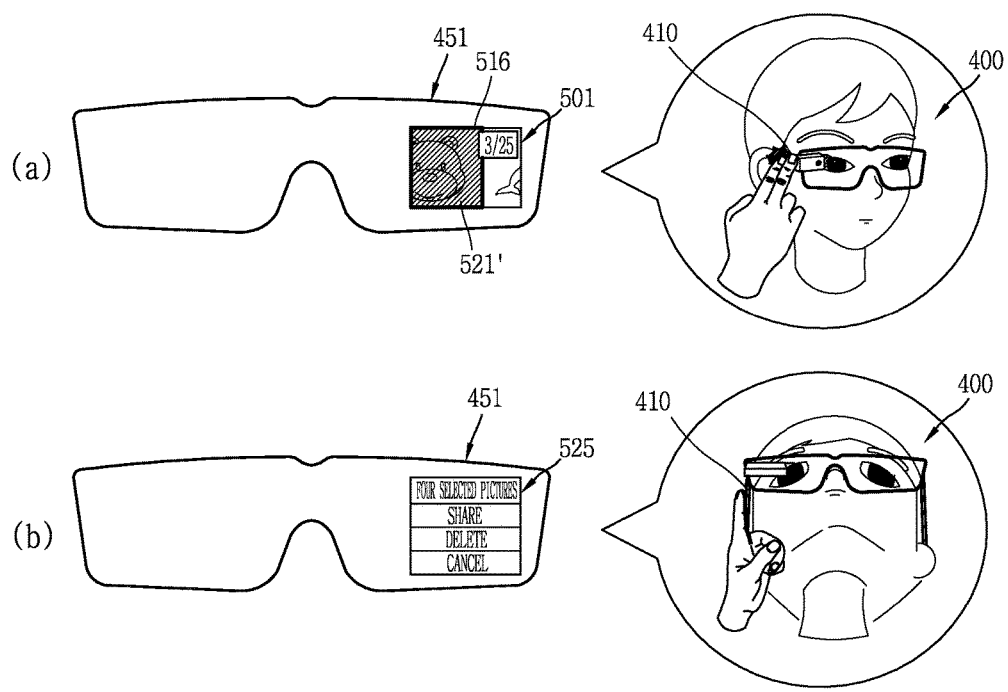

By way of example, an image may be selected through an additional touch applied by at least one of the fingers of a first touch for outputting an image on the display unit, as shown in FIG. 13A(a). The additional touch may be a single tap touch or a double tap touch. As shown in FIG. 13, if the additional touch is applied, the controller 480 selects an image output to the display unit 451. The controller 480 may output information to inform that the image has been selected. The information may include the guide image 521' overlapping the selected image 516. The controller 480 may also inform the user that the corresponding to image has been selected in other various ways. Although not shown, the touch for selecting an image may be a touch applied to a frame other than the frame to which the first touch has been applied, where the first touch may be maintained or not maintained.

Figure 13B:
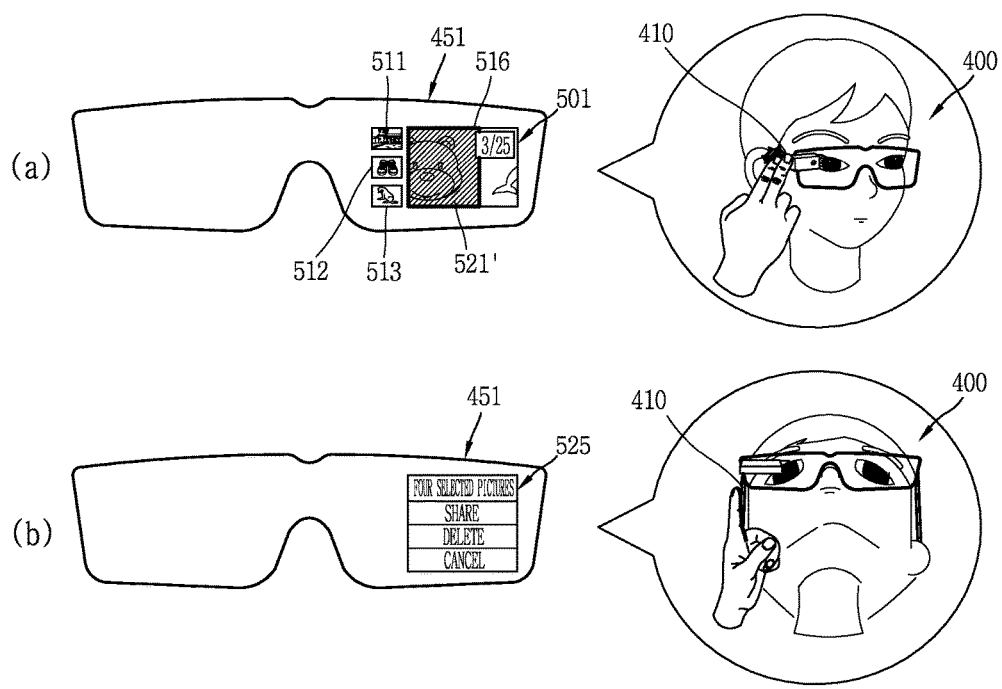
Figure 13C:
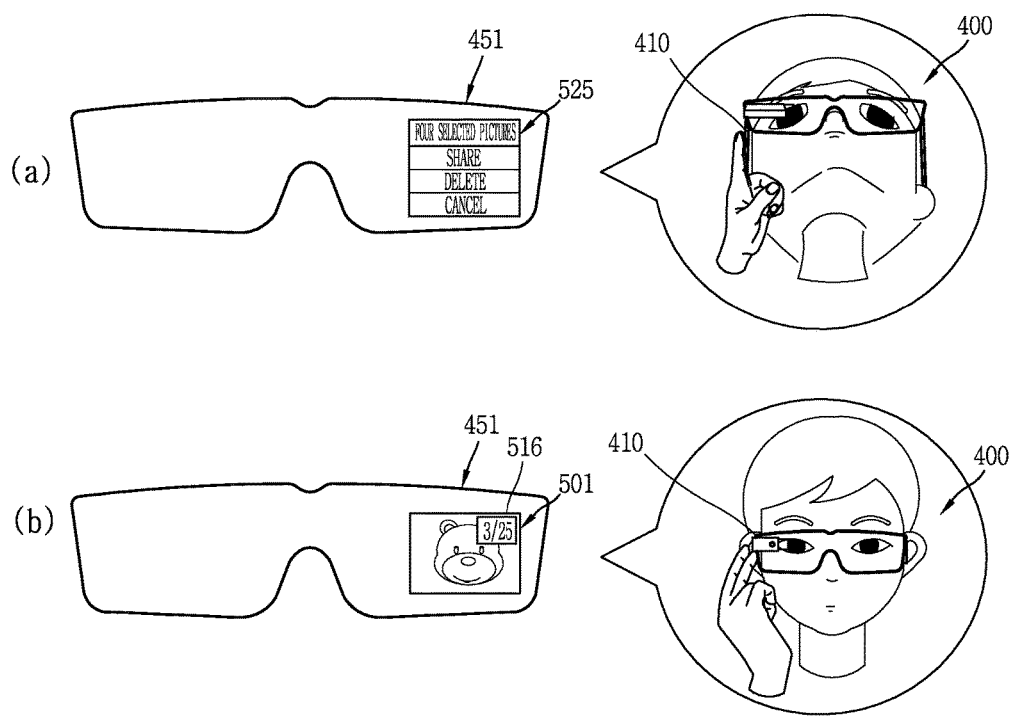

In an example, if the user's head moves in a particular direction as shown in FIG. 13A(b) with the images selected, the controller 480 may output a list 525 of the functions that may be performed in connection with the selected images. The list 525 may disappear if the user's head moves in an opposite direction as shown in FIGS. 13C(a) and (b). If the list 525 disappears, the selection of the images may be released. Although in some embodiments, even when the list disappears, the selection of the images may be maintained.

Here, the methods for selecting at least one of the items included in the list 525, performing navigation between the items, and terminating the output of the list 525 are the same or similar to the methods described above in connection with FIGS. 6A, 6B, 6C, 6d, and 12, and the detailed description thereof is omitted.

If a function related to the images requires a verifying process, guide information may be provided to allow the user to confirm execution of the corresponding function. For example, to confirm that the selected images do not include an image that the user does not want to be shared, the selected images may be shown to the user before the sharing function is performed for verification and confirmation by the user. As shown in FIG. 13B(a), the controller 480 may output thumbnail images 511, 512, and 513 corresponding to the selected images in a region of the display unit 451 in order to provide information on the selected images. The user may recognize what images currently remain selected through the thumbnail images 511, 512, and 513. Although not shown, the controller 480 may allow selection or un-selection of an image via the displayed thumbnails 511, 512, and 513 via the frame 410. For example, a selection of an image corresponding to the thumbnail image may be released through selection of the thumbnail image 511, 512, or 513.

Figure 13D:
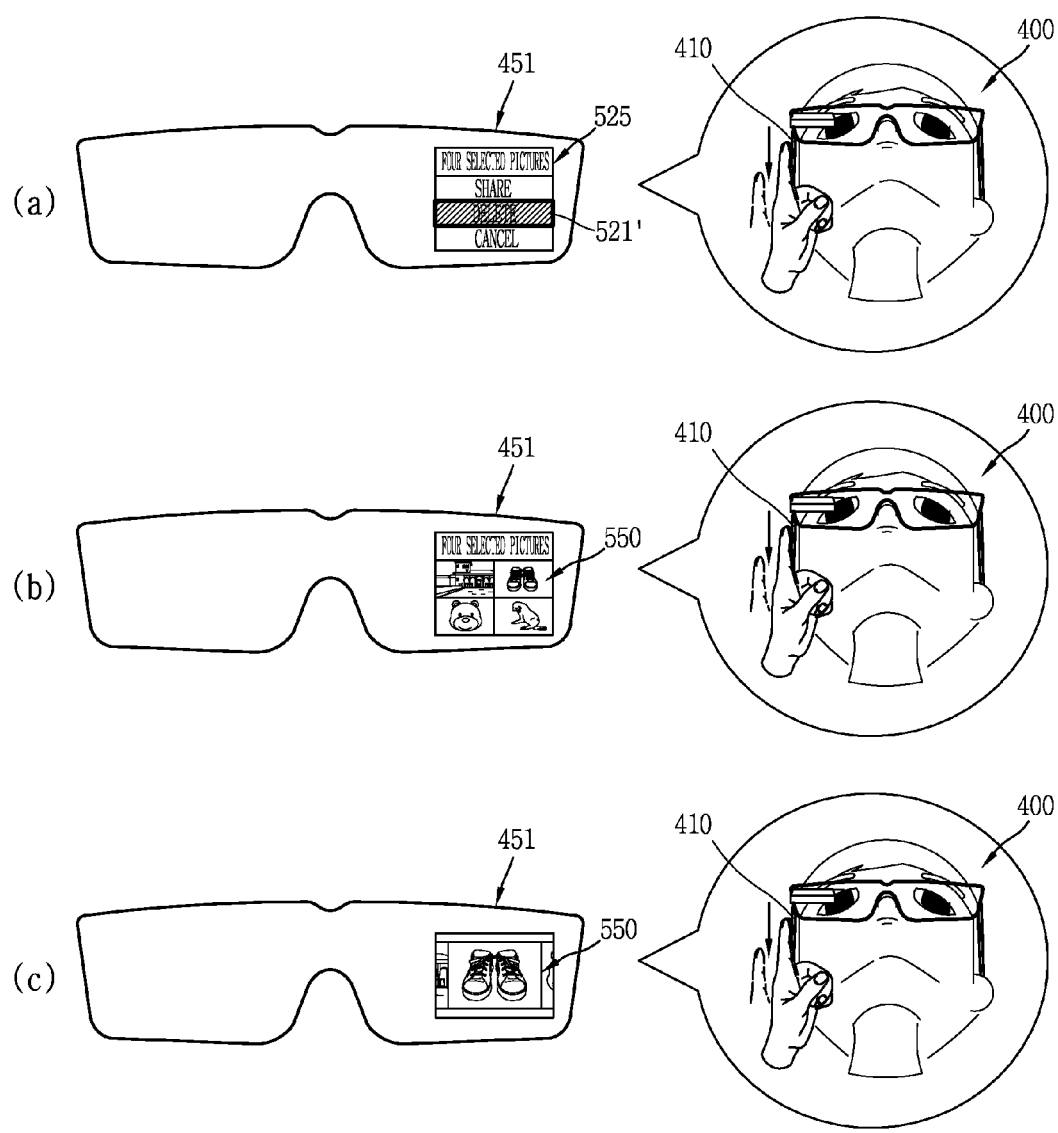

In a similar example, when deleting selected images, information on the selected images may be provided before the deleting function is performed so as to prevent accidental deletion. As an example, when the "delete" function is selected as shown in FIG. 13D(a), the controller 480 may output thumbnail images 550 of the selected images on a predetermined region 501 as shown in FIG. 13D(b). Accordingly, the user may recognize images to be deleted before the deleting function is performed.

Further, the controller 480 may output the selected images (or thumbnails of the selected images) in the predetermined region 501, while scrolling the selected images (or thumbnails of the selected items), as shown in FIG. 13D(c). In this case, the selected images may be automatically scrolled even without the user's manipulation. In another embodiment, the selected images may be scrolled in the predetermined region 501 in response to the user's additional manipulation (for example, a touch on the frame 410 or the motion of the user's head). The information on the selected images, after being output for a predetermined time, may disappear from the display unit 451, or per the user's request. Further, while the information on the selected images output, the controller 480 may perform a corresponding function per the user's request for performing the corresponding function.

In this disclosure, the "item" or "selectable item" may be "designated" for selecting, meaning that the item may be highlighted, or otherwise indicated to the user, that the designated item is to be selected (but not yet selected) with a subsequent action. The controller 480 may allow a guide image 521' to overlap the particular item (for example, the item corresponding to the deleting function) in order to inform the user of the state where the particular item is designated.

Various functions may be performed when an item is designated (but not yet selected). When a function requires providing information on the actionable selected images, the controller 480 may provide the information as described above in connection with FIG. 13C when the corresponding item is designated, such as an item corresponding to where the guide image 521' is positioned. The functions requiring providing information on the actionable selected images may be determined based on the user's selection or may be preconfigured.

In another embodiment, when an item corresponding to a particular function is selected, i.e., when receiving a request for executing the particular function (for example, a deleting function), the controller 480 may provide information on the selected images.

In other words, the controller 480 may first provide information on the selected images in response to the designation of the item to execute the function, as shown in FIGS. 13C(b) or (d) and may then receive the user's selection as to whether to finally execute the function. Although not shown, the selection may be performed through a pop-up window that is provided simultaneously or at a different time than the selected images. As another example, the selection may be made through a touch on the frame 410 or the motion of the user's head.

Meanwhile, as an example of the additional function on the selected images, there is a "collect-and-view" function (or retaining function) that brings together the selected items and show the items.

Figure 13E:
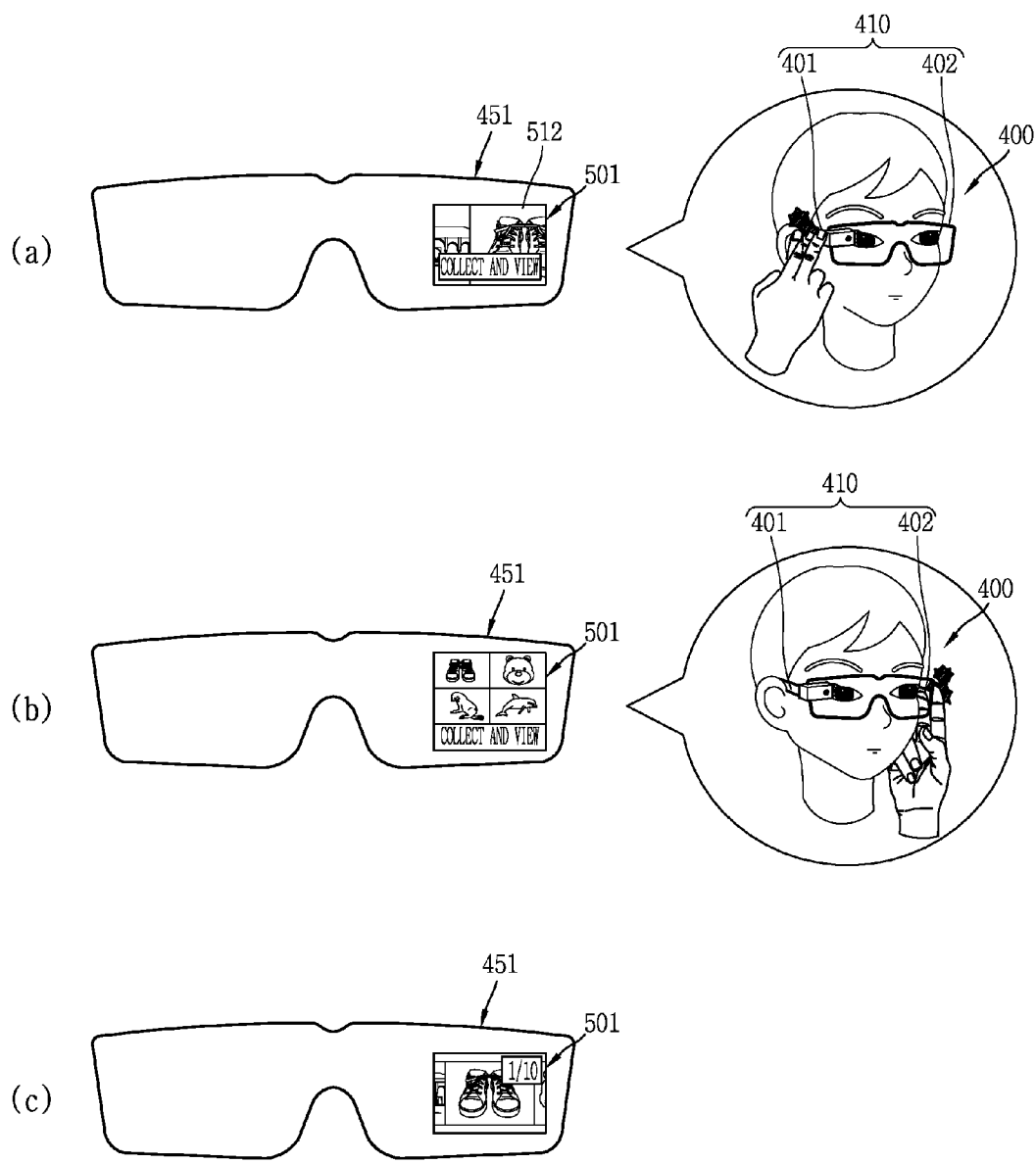

For example, as shown in FIG. 13E(a), the controller 480 may select an image 512 output to the display unit 451 as an image to be used for the collect-and-view function, in response to a predetermined type of touch on a frame (for example, the first frame 401). As shown in FIGS. 13E(b) and (c), the controller 480 may then output the selected image in response to a predetermined type of touch on a frame (e.g., the second frame 402) positioned at a side other than the side where the frame 401 is positioned.

In other words, the controller 480 may output the selected images based on the user's request received through a touch on the frame part. The controller 480 may output the selected images once the user's request is made regardless of the functions that are being performed in the glasses-type mobile terminal.

In this case, the images may be output in the predetermined region 501 simultaneously or sequentially as shown in FIG. 13E(c). Meanwhile, the sequential output may be done in response to the user's touch or automatically.

A method for selecting and outputting an image by touching frames positioned at different sides has been described. However, the present invention is not limited thereto, and other variations are considered, for example, the controller 480 may select and output an image by touching the same frame in different manners.

As set forth above, the glasses-type mobile terminal according to embodiments of the present invention may provide a captured image to the user in response to a touch on the frame. Accordingly, the user may verify the captured image by simply touching the frame. Further, the glasses-type mobile terminal according to embodiments of the present invention may output the latest captured image when sensing a touch on the frame after an image is captured through the camera. Further, the glasses-type mobile terminal according to embodiments of the present invention may provide a captured image when sensing a touch on the frame and terminate the output of the image when the touch is released.

As such, according to embodiments of the present invention, the output of an image and termination of the output may be controlled only with a touch on the frame, and the user may be thus more intuitively provided with the function relating to the captured image. Further, the glasses-type terminal according to embodiments of the present invention may provide additional functions on the captured image in response to the user's touch various parts and in various manners. As such, according to the present invention, the frame part may be used as an input means of control commands, allowing for more effective use of the glasses-type terminal.

What is claimed is:

1. An eyewear-type mobile terminal, comprising:
a camera configured to capture an image;
a memory configured to store a plurality of images captured through the camera;
a frame formed to be worn on a user's head;
a sensor configured to detect touches on the frame and detect movement of the mobile terminal;
a display coupled to the frame; and
a controller configured to:
cause the display to display a first image that is most recently captured through the camera among the plurality of images in response to a predetermined first touch detected on the frame, wherein the frame comprises a first frame portion coupled to a first side of the display and a second frame portion coupled to a second side of the display, wherein the first touch is detected on the first frame portion;
receive an image capturing request while the first image is displayed and the first touch is maintained on the frame;
perform an image capturing function in response to the image capturing request, wherein the first image is displayed on the display while the image capturing function is performed if the first touch is maintained on the frame;
cause the display to display a second image, that is captured through the camera in response to the image capturing request when the first touch is continuously maintained on the frame, wherein the first image is replaced with the second image; and
terminate display of the second image when the first touch is released,
wherein the controller is further configured to:
cause the display to display a list of functions related to the displayed first image in response to a detected movement of the mobile terminal in a first direction;
cause the display to display a plurality of selectable items each corresponding to a function of the list of functions;
cause the display to display an indicator on an indicated one of the plurality of selectable items in response to a second touch detected on the second frame portion while the first touch is detected on the first frame portion; and
execute a function corresponding to the indicated one selectable item in response to a third touch detected on the second frame portion.

2. The eyewear-type mobile terminal of claim 1, wherein:
the sensor is further configured to detect movement of the mobile terminal; and
the controller is further configured to cause the display to replace the second image with the first image in response to a movement of the user's head in a first direction.

3. The eyewear-type mobile terminal of claim 2, wherein:
the second image is displayed in a specific region of the display; and
the controller is further configured to cause the display to scroll the second image out of the specific region and scroll the first image into the specific region in response to the movement of the user's head.

4. The eyewear-type mobile terminal of claim 3, wherein a speed of scrolling the first and second images corresponds to a detected speed of the movement of the user's head.

5. The eyewear-type mobile terminal of claim 2, wherein:
the first image is an image captured earlier than the second image; and
the controller is further configured to repeatedly replace a currently displayed image with an earlier captured image.

6. The eyewear-type mobile terminal of claim 5, wherein the controller is further configured to continue repeatedly replacing the currently displayed image when the movement is no longer detected if the detected movement exceeds a threshold rotational distance value.

7. The eyewear-type mobile terminal of claim 1, wherein the controller is further configured to cause the display to scroll through the plurality of images in response to a dragged touch on the frame detected via the sensor while the first image is displayed.

8. The eyewear-type mobile terminal of claim 1, wherein the controller is further configured to change a position of the indicator to be displayed on another of the plurality of selectable items according to a dragged touch on the second frame portion, wherein the dragged touch is continuous with the second touch.

9. The eyewear-type mobile terminal of claim 1, wherein the controller is further configured to cause the display to terminate display of the list in response to a detected movement of the mobile terminal in a second direction opposite the first direction.

10. The eyewear-type mobile terminal of claim 1, wherein the controller is further configured to cause the display to change a size of the displayed first image in response to a dragged touch detected on the frame continuous with the first touch.

11. The eyewear-type mobile terminal of claim 10, wherein the controller is configured to cause the display to:
zoom-in on the displayed first image in response to the dragged touch applied in a first direction; and
zoom-out of the displayed first image in response to the dragged touch applied in a second direction opposite the first direction.

12. The eyewear-type mobile terminal of claim 11, wherein the controller is configured to cause the display to display a plurality of other images captured via the camera along with the zoomed-out displayed first image when a length of the dragged touch applied in the second direction exceeds a threshold value.

13. The eyewear-type mobile terminal of claim 1, wherein the display is transparent and comprises:
an image projector configured to project an image; and
a light path director configured to change a path of the image projected by the image projector.

14. A method for controlling an eyewear-type mobile terminal, the method comprising:
capturing an image via a camera and storing the captured image in a memory;
detecting a predetermined first touch on a frame of the mobile terminal, wherein the frame comprises a first frame portion coupled to a first side of the mobile terminal and a second frame portion coupled to a second side of the mobile terminal, wherein the first touch is detected on the first frame portion;
displaying a first image that is most recently captured through the camera among a plurality of images in response to a predetermined first touch detected on the frame;
displaying a list of functions related to the displayed first image in response to a detected movement of the mobile terminal;
cause the display to display a plurality of selectable items each corresponding to a function of the list of functions;
cause the display to display an indicator on one of the plurality of selectable items in response to a second touch detected on the second frame portion while the first touch is detected on the first frame portion;
execute a function corresponding to the one selectable item in response to a third touch detected on the second frame portion;
receiving an image capturing request while the first image is displayed and the first touch is maintained on the frame;
perform an image capturing function in response to the image capturing request, wherein the first image is displayed on the display while the image capturing function is performed if the first touch is maintained on the frame;
displaying a second image that is captured through the camera in response to the image capturing request when the first touch is continuously maintained on the frame, wherein the first image is replaced with the second image; and
terminating display of the first image in response to the first touch being released.

* * * * *